US011711517B2

(12) United States Patent
Ye et al.

(10) Patent No.: US 11,711,517 B2
(45) Date of Patent: *Jul. 25, 2023

(54) METHOD AND SYSTEM FOR PROCESSING LUMA AND CHROMA SIGNALS

(71) Applicant: ALIBABA GROUP HOLDING LIMITED, Grand Cayman (KY)

(72) Inventors: Yan Ye, San Mateo, CA (US); Jie Chen, San Mateo, CA (US); Ru-Ling Liao, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,625

(22) Filed: Jun. 28, 2021

(65) Prior Publication Data

US 2022/0132130 A1 Apr. 28, 2022

Related U.S. Application Data

(63) Continuation of application No. 16/887,048, filed on May 29, 2020, now Pat. No. 11,051,022.

(60) Provisional application No. 62/865,815, filed on Jun. 24, 2019.

(51) Int. Cl.
*H04N 19/00* (2014.01)
*H04N 19/132* (2014.01)
*H04N 19/176* (2014.01)
*H04N 19/186* (2014.01)
*H04N 19/14* (2014.01)

(52) U.S. Cl.
CPC ........... *H04N 19/132* (2014.11); *H04N 19/14* (2014.11); *H04N 19/176* (2014.11); *H04N 19/186* (2014.11)

(58) Field of Classification Search
CPC .... H04N 19/132; H04N 19/14; H04N 19/176; H04N 19/186
See application file for complete search history.

(56) References Cited

U.S. PATENT DOCUMENTS

| 2011/0007979 | A1 | 1/2011 | Goma |
| 2013/0136174 | A1 | 5/2013 | Xu et al. |
| 2014/0355667 | A1 | 12/2014 | Lei et al. |

(Continued)

OTHER PUBLICATIONS

European Patent Office Communication issued for Application No. 20831392.4 which encloses the Supplementary European Search Report (Art. 153(7) EPC) and the European search opinion, dated Jun. 30, 2022, 7 pages.

(Continued)

*Primary Examiner* — Zhihan Zhou
(74) *Attorney, Agent, or Firm* — Finnegan, Henderson, Farabow, Garrett & Dunner, LLP

(57) ABSTRACT

The present disclosure provides systems and methods for processing video content. The method can include: receiving data representing a first block and a second block in a picture, the data comprising a plurality of chroma samples associated with the first block and a plurality of luma samples associated with the second block; determining an average value of the plurality of luma samples associated with the second block; determining a chroma scaling factor for the first block based on the average value; and processing the plurality of chroma samples associated with the first block using the chroma scaling factor.

20 Claims, 25 Drawing Sheets

(56) References Cited

U.S. PATENT DOCUMENTS

| | | | |
|---|---|---|---|
| 2014/0369426 A1* | 12/2014 | Li | H04N 19/186 375/240.29 |
| 2015/0016512 A1 | 1/2015 | Pu et al. | |
| 2015/0124865 A1* | 5/2015 | Kim | H04N 19/105 375/240.12 |
| 2017/0359595 A1* | 12/2017 | Zhang | H04N 19/176 |
| 2018/0048909 A1* | 2/2018 | Liu | H04N 19/105 |
| 2018/0278934 A1 | 9/2018 | Andersson et al. | |
| 2019/0068969 A1* | 2/2019 | Rusanovskyy | H04N 19/1887 |
| 2019/0289306 A1* | 9/2019 | Zhao | H04N 19/61 |
| 2020/0288126 A1* | 9/2020 | Hu | H04N 19/96 |
| 2020/0288159 A1* | 9/2020 | Van der Auwera | H04N 19/186 |
| 2020/0329257 A1* | 10/2020 | Zhao | H04N 19/615 |

OTHER PUBLICATIONS

Francois et al., "Chroma residual scaling with separate luma/chroma tree," JVET-N0389r2, 14$^{th}$ meeting: Geneva, CH Mar. 19-27, 2019, 12 pages.

Lin et al., "AHG16: Subblock-based chroma residual scaling," JVET-N0113-v2, 14$^{th}$ Meeting, Geneva, CH Mar. 19-27, 2019, 5 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

Sullivan et al., "Overview of the High Efficiency Video Coding (HEVC) Standard," IEEE Transactions on Circuits and Systems for Video Technology, vol. 22, No. 12, pp. 1649-1668, Dec. 2012.

Chen et al. "Algorithm description of Joint Exploration Test Model 7 (JEM7)", Joint Video Exploration Team (JVET), JVET-G1001, 7th Meeting: Torino, IT, Jul. 13-21, 2017, .48 pages.

Segall, "Joint Call for Proposals on Video Compression with Capability beyond HEVC," Joint Video Experts Team (JVET), JVET-H1002, 8th Meeting: Macao, CN, Oct. 18-24, 2017, 27 pages.

Bross et al. "Versatile Video Coding (draft 4)", Joint Video Experts Team (JVET), JVET-M1001, 13th Meeting: Marrakech, MA, Jan. 9-18, 2019, 300 pages.

Bross et al. "Versatile Video Coding (draft 5)", Joint Video Experts Team (JVET), JVET-N1001, 14th Meeting: Geneva, CH, Mar. 19-27, 2019, 406 pages.

Chen et al. "Algorithm description for Versatile Video Coding and Test Model 4 (VTM 4)," Joint Video Experts Team (JVET), 13th Meeting: Marrakech, MA, Jan. 9-18, 2019, JVET-M1002, Jan. 2019, 60 pages.

Lu et al. "CE12: Mapping functions (test CE12-1 and CE12-2)," JVET-M0427, Jan. 2019, 10 pages.

PCT International Search Report and Written Opinion dated Aug. 7, 2020, issued in corresponding International Application No. PCT/US2020/035049 (13 pgs.).

Sullivan et al., "Video Compression—From Concepts to the H.264/AVC Standard," Proceedings of the IEEE, vol. 93, No. 1, pp. 18-31 (2005).

* cited by examiner

Table 1

| tile_group_header( ) { | Descriptor |
|---|---|
| ... | |
|   if ( sps_reshaper_enabled_flag ) { | |
|     tile_group_reshaper_model_present_flag | u(1) |
|     if ( tile_group_reshaper_model_present_flag ) | |
|       tile_group_reshaper_model ( ) | |
|     tile_group_reshaper_enable_flag | u(1) |
|     if ( tile_group_reshaper_enable_flag && (!( qtbtt_dual_tree_intra_flag && tile_group_type == I ) ) ) | |
|       tile_group_reshaper_chroma_residual_scale_flag | u(1) |
|   } | |
|   byte_alignment( ) | |
| } | |

FIG. 6: Tile Group Level Syntax Table for LMCS

Table 2

| tile_group_reshaper_model () { | Descriptor |
|---|---|
|    reshaper_model_min_bin_idx | ue(v) |
|    reshaper_model_delta_max_bin_idx | ue(v) |
|    reshaper_model_bin_delta_abs_cw_prec_minus1 | ue(v) |
|    for ( i = reshaper_model_min_bin_idx; i <= reshaper_model_max_bin_idx; i++ ) { | |
|      reshape_model_bin_delta_abs_CW [ i ] | u(v) |
|      if ( reshaper_model_bin_delta_abs_CW[ i ] ) > 0 ) | |
|        reshaper_model_bin_delta_sign_CW_flag[ i ] | u(1) |
|    } | |
| } | |

FIG. 7: Syntax Table for LMCS

Table 3

| slice_header() | |
| --- | --- |
| ... | |
| if( sps_lmcs_enabled_flag ) { | |
|     slice_lmcs_enabled_flag | u(1) |
|     if( slice_lmcs_enabled_flag ) { | |
|         slice_lmcs_aps_id | u(5) |
|         if( !( qtbtt_dual_tree_intra_flag && slice_type == I ) ) | |
|             slice_chroma_residual_scale_flag | u(1) |
|     } | |
| } | |

FIG. 8: Slice Level Syntax Table for LMCS

Table 4

| lmcs_data ( ) { | Descriptor |
|---|---|
|   lmcs_min_bin_idx | ue(v) |
|   lmcs_delta_max_bin_idx | ue(v) |
|   lmcs_bin_delta_abs_cw_prec_minus1 | ue(v) |
|   for ( i = lmcs_min_bin_idx; i <= lmcs_max_bin_idx; i++ ) { | |
|     lmcs_bin_delta_abs_CW [ i ] | u(v) |
|     if ( reshaper_model_bin_delta_abs_CW[ i ] ) > 0 ) | |
|       lmcs_bin_delta_sign_CW_flag[ i ] | u(1) |
|   } | |
| } | |

FIG. 9: Syntax Table for LMCS

Table 5

| Chroma prediction mode | Corresponding luma intra prediction mode | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

FIG. 11: Derivation of Chroma Prediction Mode from Luma Mode When CCLM is Enabled

Table 6

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( tile_group_sao_luma_flag \|\| tile_group_sao_chroma_flag ) | |
|     sao( xCtb >> CtbLog2SizeY, yCtb >> CtbLog2SizeY ) | |
| if( tile_group_alf_enabled_flag ){ | |
|     alf_ctb_flag[ 0 ][ xCtb >> Log2CtbSize ][ yCtb >> Log2CtbSize ] | ae(v) |
|     if( alf_chroma_idc == 1 \|\| alf_chroma_idc == 3 ) | |
|         alf_ctb_flag[ 1 ][ xCtb >> Log2CtbSize ][ yCtb >> Log2CtbSize ] | ae(v) |
|     if( alf_chroma_idc == 2 \|\| alf_chroma_idc == 3 ) | |
|         alf_ctb_flag[ 2 ][ xCtb >> Log2CtbSize ][ yCtb >> Log2CtbSize ] | ae(v) |
| } | |
| if( ( tile_group_type == I \|\| CurrPicIsOnlyRef ) && qtbtt_dual_tree_intra_flag ) | |
|     dual_tree_implicit_qt_split ( xCtb, yCtb, CtbLog2SizeY, 0 ) | |
| else | |
|     coding_quadtree( xCtb, yCtb, CtbLog2SizeY, 0, SINGLE_TREE ) | |
| } | |

FIG. 12: Exemplary Coding Tree Unit Syntax Structure

Table 7

| dual_tree_implicit_qt_split( x0, y0, log2CbSize, cqtDepth ) { | Descriptor |
|---|---|
|   if( log2CbSize > 6 ) { | |
|     x1 = x0 + ( 1 << ( log2CbSize − 1 ) ) | |
|     y1 = y0 + ( 1 << ( log2CbSize − 1 ) ) | |
|     dual_tree_implicit_qt_split( x0, y0, log2CbSize − 1, cqtDepth + 1 ) | |
|     if( x1 < pic_width_in_luma_samples ) | |
|       dual_tree_implicit_qt_split( x1, y0, log2CbSize − 1, cqtDepth + 1 ) | |
|     if( y1 < pic_height_in_luma_samples ) | |
|       dual_tree_implicit_qt_split( x0, y1, log2CbSize − 1, cqtDepth + 1 ) | |
|     if( x1 < pic_width_in_luma_samples && y1 < pic_height_in_luma_samples ) | |
|       dual_tree_implicit_qt_split( x1, y1, log2CbSize − 1, cqtDepth + 1 ) | |
|   } else { | |
|     coding_quadtree( x0, y0, log2CbSize, cqtDepth, DUAL_TREE_LUMA ) | |
|     coding_quadtree( x0, y0, log2CbSize, cqtDepth, DUAL_TREE_CHROMA ) | |
|   } | |
| } | |

FIG. 13: Exemplary Dual Tree Partition Syntax Structure

Table 8

| coding_tree_unit( ) { | Descriptor |
|---|---|
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| .... | |
| if( slice_type == I && qtbtt_dual_tree_intra_flag ) | |
|     dual_tree_implicit_qt_split ( xCtb, yCtb, CtbSizeY, 0 ) | |
| else | |
|     coding_tree( xCtb, yCtb, CtbLog2SizeY, CtbSizeY, 1, 0, 0, 0, 0, 0, SINGLE_TREE ) | |
| } | |

FIG. 14: Exemplary Coding Tree Unit Syntax Structure

Table 9

| dual_tree_implicit_qt_split( x0, y0, cbSize, cqtDepth ) { | Descriptor |
|---|---|
|   cbSubdiv = 2 * cqtDepth | |
|   if( cbSize > 64 ) { | |
|     if( cu_qp_delta_enabled_flag && cbSubdiv <= cu_qp_delta_subdiv ) { | |
|       IsCuQpDeltaCoded = 0 | |
|       CuQpDeltaVal = 0 | |
|       CuQgTopLeftX = x0 | |
|       CuQgTopLeftY = y0 | |
|     } | |
|     x1 = x0 + ( cbSize / 2 ) | |
|     y1 = y0 + ( cbSize / 2 ) | |
|     dual_tree_implicit_qt_split( x0, y0, cbSize / 2, cqtDepth + 1 ) | |
|     if( x1 < pic_width_in_luma_samples ) | |
|       dual_tree_implicit_qt_split( x1, y0, cbSize / 2, cqtDepth + 1 ) | |
|     if( y1 < pic_height_in_luma_samples ) | |
|       dual_tree_implicit_qt_split( x0, y1, cbSize / 2, cqtDepth + 1 ) | |
|     if( x1 < pic_width_in_luma_samples && y1 < pic_height_in_luma_samples ) | |
|       dual_tree_implicit_qt_split( x1, y1, cbSize / 2, cqtDepth + 1 ) | |
|   } else { | |
|     coding_tree( x0, y0, cbSize, cbSize, 1, cbSubdiv, cqtDepth, 0, 0, 0, <br>        DUAL_TREE_LUMA ) | |
|     coding_tree( x0, y0, cbSize, cbSize, 0, cbSubdiv, cqtDepth, 0, 0, 0, <br>        DUAL_TREE_CHROMA ) | |
|   } | |
| } | |

FIG. 15: Exemplary Dual Tree Partition Syntax Structure

Partition of Chroma
Block 1600

Partition of Luma Block
1610

Table 10

| coding_unit( x0, y0, cbWidth, cbHeight, treeType ) { | Descriptor |
|---|---|
| ... | |
| if( CuPredMode[ x0 ][ y0 ] == MODE_INTRA ) { | |
| .... | |
| if( treeType == SINGLE_TREE \|\| treeType == DUAL_TREE_CHROMA ) | |
| { | |
| intra_chroma_pred_mode[ x0 ][ y0 ] | ae(v) |
| if ( tile_group_reshaper_chroma_residual_scale_flag ) | |
| lmcs_chroma_scaling_idx[ x0 ][ y0 ] | ae(v) |
| } | |
| } | |
| .... | |

— 2002

FIG. 20: Exemplary Coding Tree Unit Syntax Structure

Table 11

| coding_unit( x0, y0, cbWidth, cbHeight, treeType ) { | Descriptor |
|---|---|
| ... | |
| if( CuPredMode[ x0 ][ y0 ] == MODE_INTRA ) { | |
| .... | |
| if( treeType == SINGLE_TREE \|\| treeType == DUAL_TREE_CHROMA ) | |
| { | |
| intra_chroma_pred_mode[ x0 ][ y0 ] | ae(v) |
| *if ( slice_reshaper_chroma_residual_scale_flag )* | |
| *lmcs_chroma_scaling_idx[ x0 ][ y0 ]* | *ae(v)* |
| } | |
| } | |
| .... | |

— 2102

FIG. 21: Exemplary Coding Tree Unit Syntax Structure

Table 12

| tile_group_reshaper_model () { | Descriptor |
|---|---|
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   *reshaper_model_bin_num_unique_cw_minus1* | *ue(v)* |
|   *for ( i = 0; i <= reshaper_model_bin_num_unique_cw_minus1; i++ ) {* | |
|     reshape_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
|   *for ( i = reshaper_model_min_bin_idx; i <= reshaper_model_max_bin_idx; i++ )* | |
|     *reshaper_model_bin_cw_idx [ i ]* | *u(v)* |
| } | |

— 2202 (rows: reshaper_model_bin_num_unique_cw_minus1 and for loop)
— 2204 (rows: for loop and reshaper_model_bin_cw_idx)

FIG. 22: Modified Signaling of the LMCS Piecewise Linear Model at Slice level

METHOD AND SYSTEM FOR PROCESSING LUMA AND CHROMA SIGNALS

CROSS REFERENCE TO RELATED APPLICATION

The present application is a continuation of U.S. patent application Ser. No. 16/887,048, filed on May 29, 2020, which claims the benefits of priority to U.S. Provisional Application No. 62/865,815, filed Jun. 24, 2019, both of which are incorporated herein by reference in their entireties.

TECHNICAL FIELD

The present disclosure generally relates to video processing, and more particularly, to methods and systems for performing luma mapping with chroma scaling.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding, and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard and the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of the present disclosure provide methods and systems for performing in-loop luma mapping with chroma scaling and cross component linear model.

In one exemplary embodiment, the method includes: receiving data representing a first block and a second block in a picture, the data comprising a plurality of chroma samples associated with the first block and a plurality of luma samples associated with the second block; determining an average value of the plurality of luma samples associated with the second block; determining a chroma scaling factor for the first block based on the average value; and processing the plurality of chroma samples associated with the first block using the chroma scaling factor.

In some embodiments, the system include: a memory for storing a set of instructions; and at least one processor configured to execute the set of instructions to cause the system to perform: receiving data representing a first block and a second block in a picture, the data comprising a plurality of chroma samples associated with the first block and a plurality of luma samples associated with the second block; determining an average value of the plurality of luma samples associated with the second block; determining a chroma scaling factor for the first block based on the average value; and processing the plurality of chroma samples associated with the first block using the chroma scaling factor.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 is a tile group level syntax table for LMCS, according to some embodiments of the disclosure.

FIG. 7 is a syntax table for LMCS, according to some embodiments of the disclosure.

FIG. 8 is a slice level syntax table for LMCS, according to some embodiments of the disclosure.

FIG. 9 is a syntax table for LMCS piecewise linear model, according to some embodiments of the disclosure.

FIG. 11 is a table for derivation of chroma prediction mode from luma mode when CCLM is enabled, according to some embodiments of the disclosure FIG. 12 is an exemplary coding tree unit syntax structure, according to some embodiments of the disclosure.

FIG. 13 is an exemplary dual tree partition syntax structure, according to some embodiments of the disclosure.

FIG. 14 is an exemplary coding tree unit syntax structure, according to some embodiments of the disclosure.

FIG. 15 is an exemplary dual tree partition syntax structure, according to some embodiments of the disclosure.

FIG. 20 is an exemplary coding tree unit syntax structure, according to some embodiments of the disclosure.

FIG. 21 is another exemplary coding tree unit syntax structure, according to some embodiments of the disclosure.

FIG. 22 is an exemplary modified signaling of the LMCS piecewise linear model at slice level, according to some embodiments of the disclosure.

DETAILED DESCRIPTION

Figure 1:
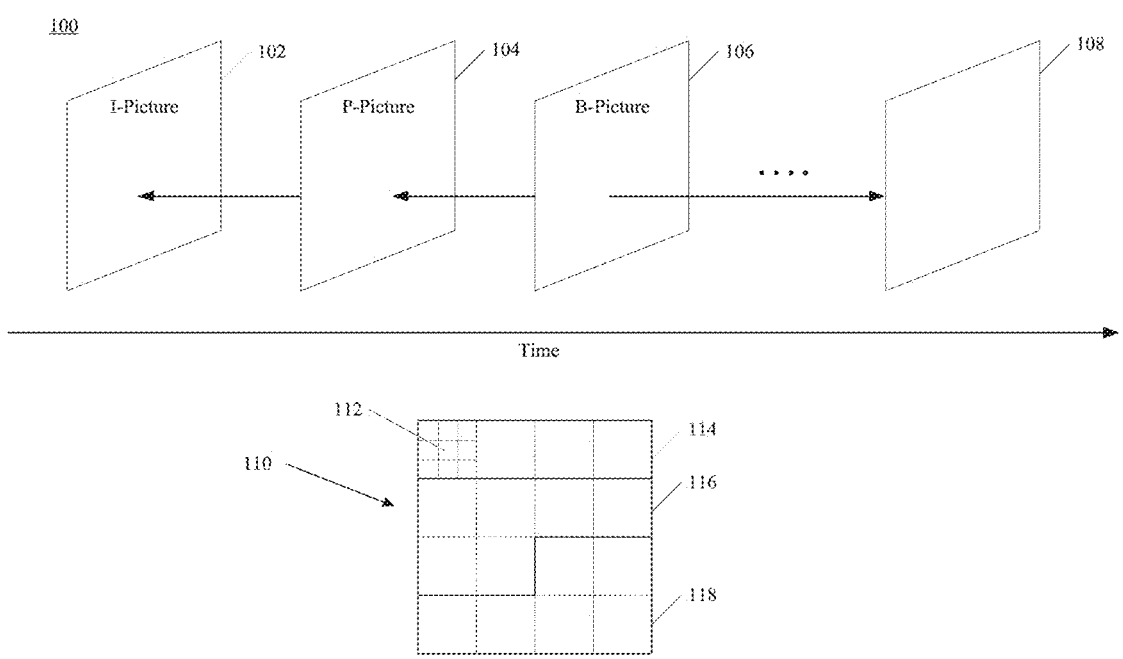
FIG. 1 illustrates structures of an example video sequence, according to some embodiments of this disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for monitoring, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, one of the goals for developing new video coding techniques is to improve the coding efficiency, i.e., using less coded data to represent the same picture quality. The present disclosure provides methods and systems for performing luma mapping with chroma scaling. The luma mapping is a process for mapping luma samples to use in the loop filter, and the chroma scaling is a luma-dependent process for scaling chroma residue values. ve the same subjective quality as HEVC/H.265 using half the bandwidth LMCS has two main components: 1) a process for mapping input luma code values to a new set of code values for use inside the coding loop; and 2) a luma-dependent process for scaling chroma residue values. The luma mapping process improves the coding efficiency for standard and high dynamic range video signals by making better use of the range of luma code values allowed at a specified bit depth.

FIG. 1 illustrates structures of an example video sequence 100 using in video coding, according to some embodiments of this disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

Figure 2A:
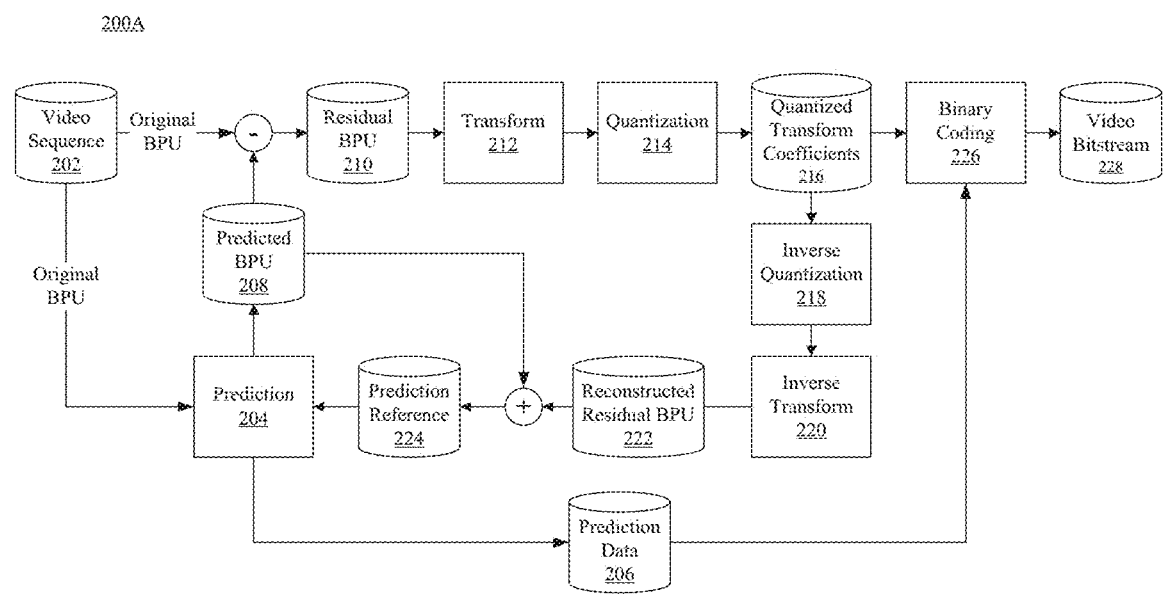
FIG. 2A illustrates a schematic diagram of an example encoding process, according to some embodiments of this disclosure.

FIG. 2A illustrates a schematic diagram of an example encoding process 200A, according to some embodiments of this disclosure. An encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
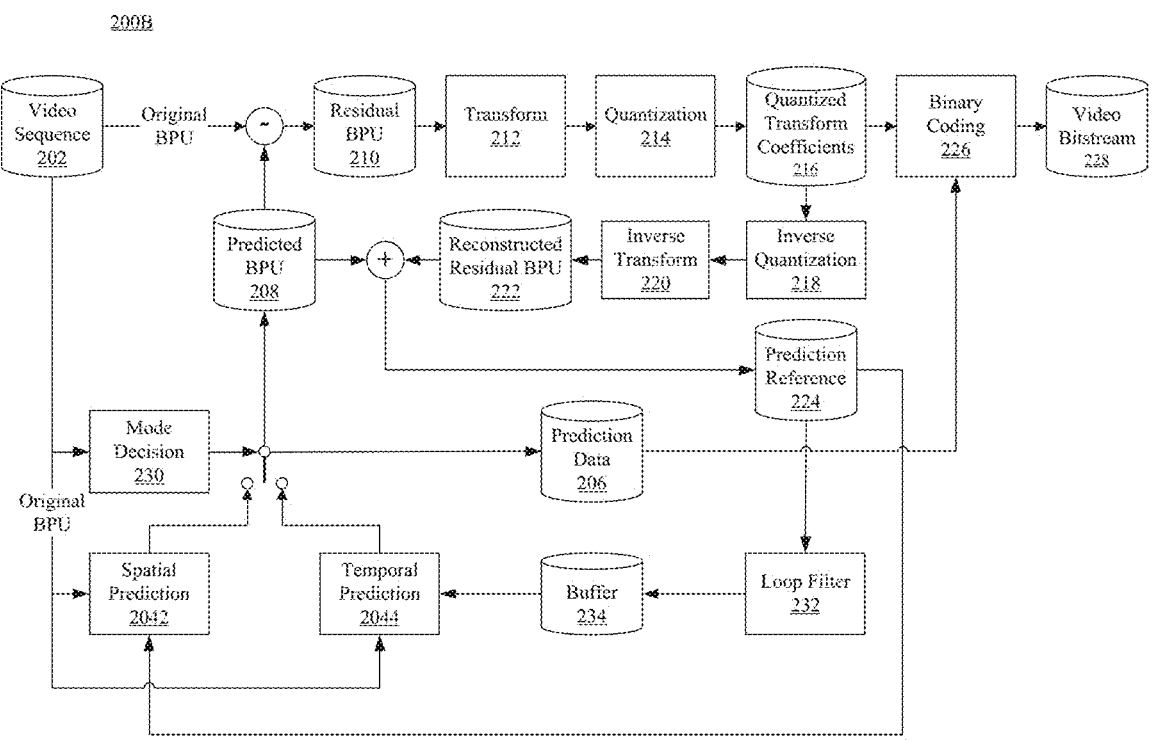
FIG. 2B illustrates a schematic diagram of another example encoding process, according to some embodiments of this disclosure.

FIG. 2B illustrates a schematic diagram of another example encoding process 200B, according to some embodiments of this disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
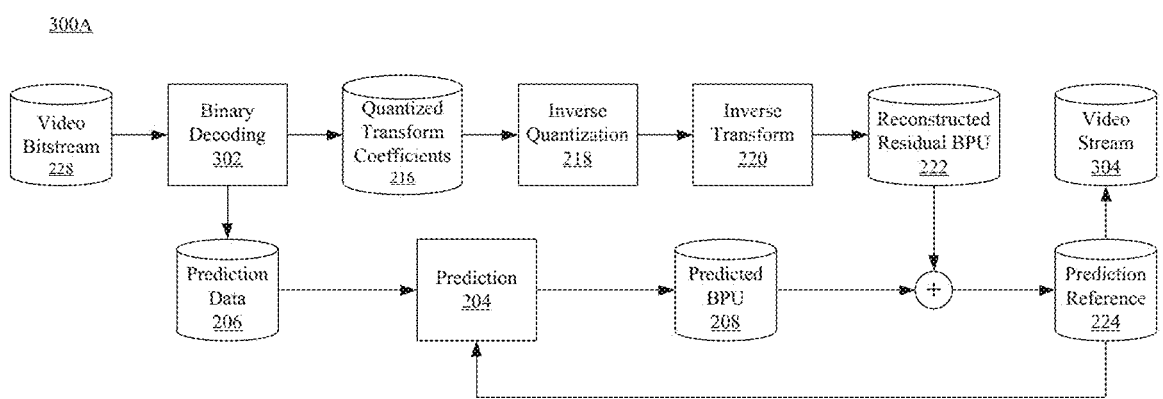
FIG. 3A illustrates a schematic diagram of an example decoding process, according to some embodiments of this disclosure.

FIG. 3A illustrates a schematic diagram of an example decoding process 300A, according to some embodiments of this disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
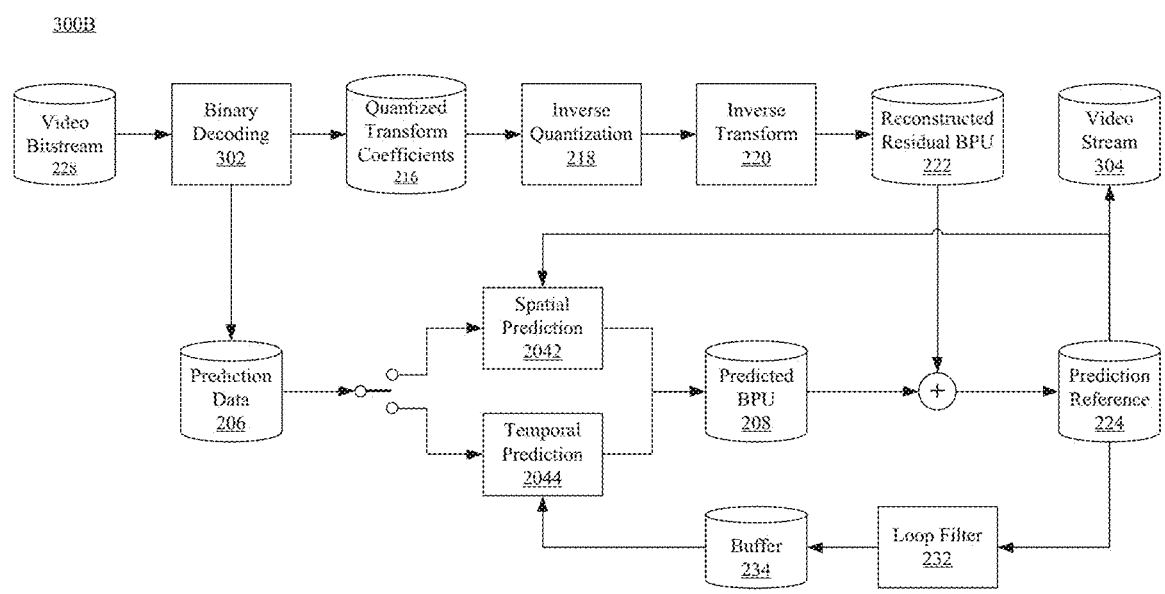
FIG. 3B illustrates a schematic diagram of another example decoding process, according to some embodiments of this disclosure.

FIG. 3B illustrates a schematic diagram of another example decoding process 300B, according to some embodiments of this disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
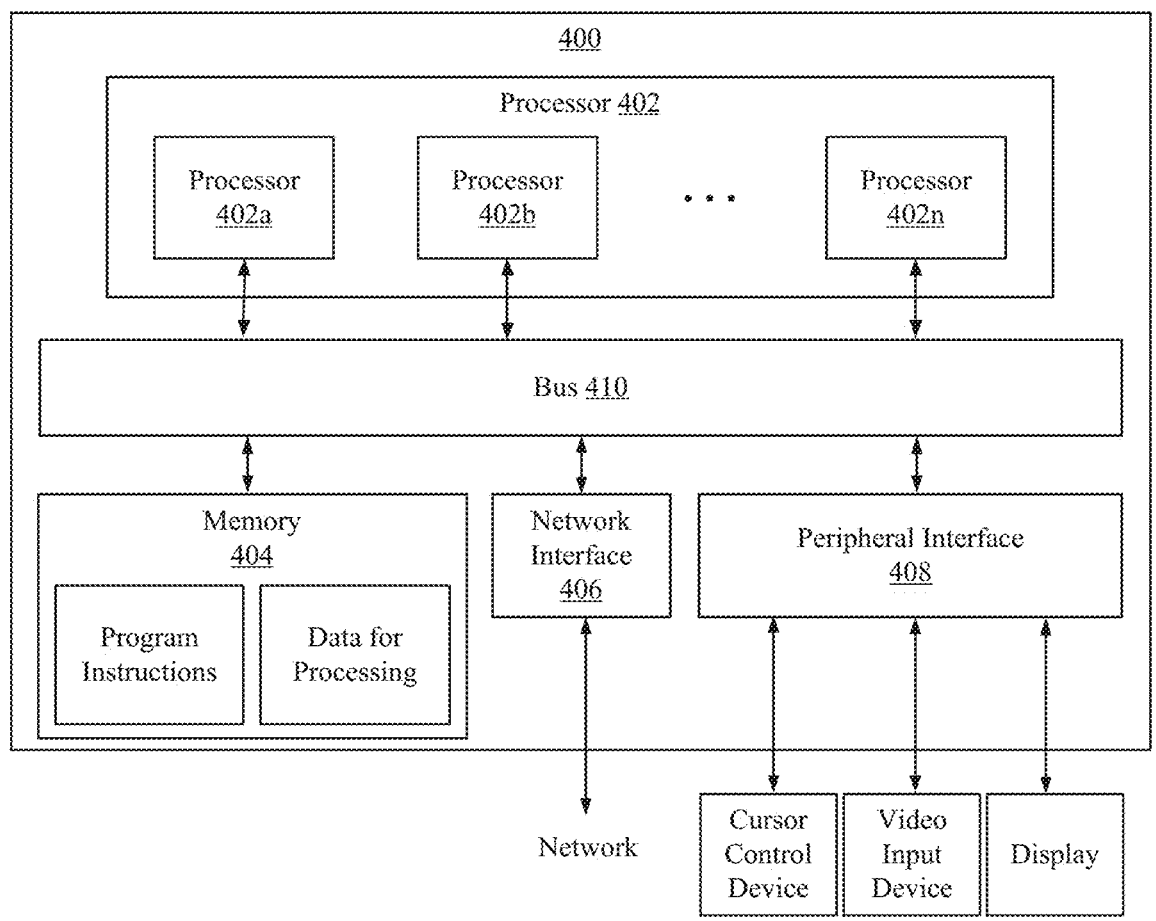
FIG. 4 illustrates a block diagram of an example apparatus for encoding or decoding a video, according to some embodiments of this disclosure.

FIG. 4 is a block diagram of an example apparatus 400 for encoding or decoding a video, according to some embodiments of this disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Figure 5:
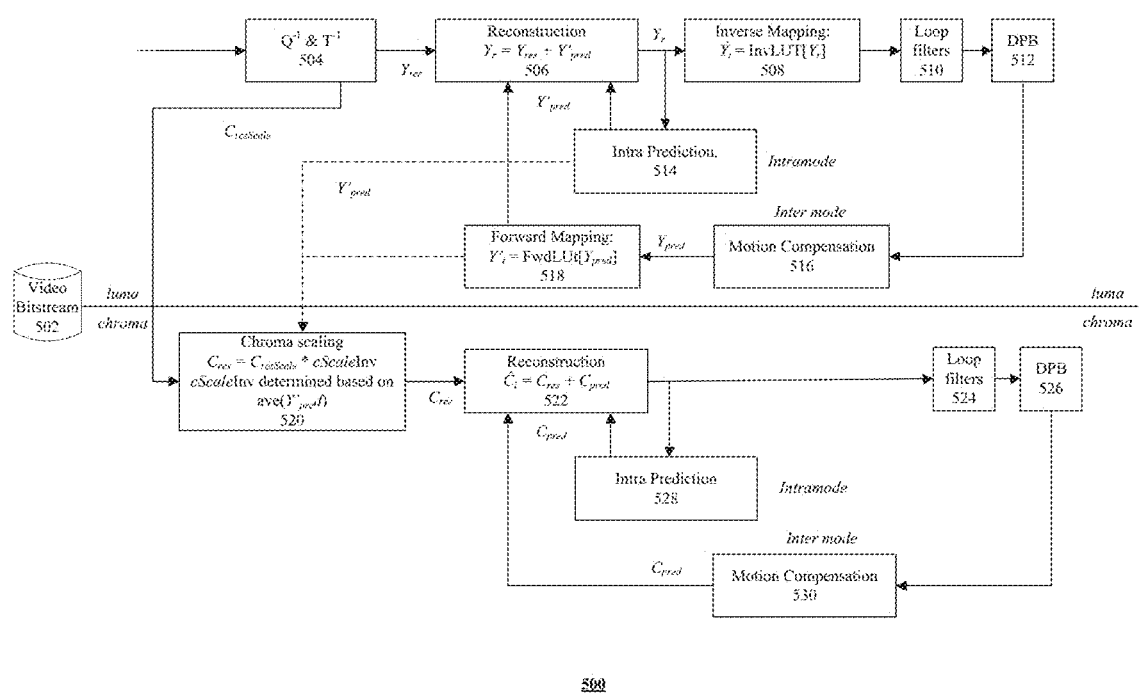
FIG. 5 illustrates a schematic diagram of an exemplary luma mapping with chroma scaling (LMCS) process, according to some embodiments of the disclosure.

FIG. 5 illustrates a schematic diagram of an exemplary luma mapping with chroma scaling (LMCS) process 500, according to some embodiments of the disclosure. For example, process 500 can be used by a decoder conforming to a hybrid video coding standard (e.g., H.26x series). The LMCS is a new processing block applied before loop filter 232 of FIG. 2B. The LMCS can also be referred to as a reshaper.

LMCS process 500 can include an in-looping mapping of the luma component values based on an adaptive piecewise linear model and a luma-dependent chroma residual scaling of the chroma components.

As shown in FIG. 5, the in-looping mapping of the luma component values based on an adaptive piecewise linear model can include a forward mapping stage 518 and an inverse mapping stage 508. The luma-dependent chroma residual scaling of the chroma components can include chroma scaling 520.

Sample values before mapping or after inverse mapping can be referred to as samples in the original domain, and sample values after mapping and before inverse mapping can be referred to as samples in the mapped domain. Some stages in process 500 can be performed in the mapped domain instead of the original domain, when LMCS is enabled. It is appreciated that forward mapping stage 518 and inverse mapping stage 508 can be enabled/disabled at the sequence level using an SPS flag.

As shown in FIG. 5, $Q^{-1}$&$T^{-1}$ stage 504, reconstruction 506, and intra prediction 514 are performed in the mapped domain. For example, $Q^{-1}$&$T^{-1}$ stage 504 can include inverse quantization and inverse transform, reconstruction 506 can include addition of the luma prediction and the luma residual, and intra prediction 508 can include luma intra prediction.

Loop filters 510, motion compensation stages 516 and 530, intra prediction stage 528, reconstruction stage 522, and decoded picture buffer (DPB) 512 and 526 are performed in the original (i.e., non-mapped) domain. In some embodiments, loop filters 510 can include deblocking, an adaptive loop filter (ALF), and sample adaptive offset (SAO), reconstruction stage 522 can include addition of the chroma prediction together with the chroma residual, and DPB 512 and 526 can store decoded pictures as reference pictures.

In some embodiments, a method for processing video content using luma mapping with a piecewise linear model can be applied.

The in-loop mapping of the luma component can adjust the signal statistics of the input video by redistributing the codewords across the dynamic range to improve compression efficiency. Luma mapping makes use of a forward mapping function, "FwdMap" and a corresponding inverse mapping function "InvMap." The "FwdMap" function is signaled using a piecewise linear model with 16 equal pieces. "InvMap" function does not need to be signaled and is instead derived from the "FwdMap" function.

Signaling of the piecewise linear model is shown in Table 1 of FIG. 6 and Table 2 of FIG. 7, and later in VVC draft 5, signaling of piecewise linear model is changed as in Table 3 of FIG. 8 and Table 4 of FIG. 9. Table 1 and Table 3 show syntax structures of the tile group header and the slice header. First a reshaper model parameter presence flag can be signaled to indicate if the luma mapping model is present in a target tile group or a target slice. If the luma mapping model is present in the current tile group/slice, piecewise linear model parameters corresponding to the target tile group or the target slice can be signaled in tile_group_reshaper_model( )/lmcs_data( ) using the syntax elements shown in Table 2 of FIG. 7 and Table 4 of FIG. 9. The piecewise linear model partitions the input signal's dynamic range into 16 equal pieces. For each piece, its linear mapping parameters can be expressed using a number of codewords assigned to the piece. In an example of a 10-bit input, each of the 16 pieces of the input can have 64 codewords assigned to the piece by default. A number of signaled codewords can be used to calculate a scaling factor and adjust the mapping function accordingly for the piece. Table 2 of FIG. 7 and Table 4 of FIG. 9 also define a minimum index and a maximum index among the number of signaled codewords, such as "reshaper_model_min_bin_idx" and "reshaper_model_delta_max_bin_idx" as in Table 2, "lmcs_min_bin_idx" and "lmcs_delta_max_bin_idx" as in Table 4, inclusively. If the piece index is smaller than "reshaper_model_min_bin_idx" or "lmcs_min_bin_idx" or larger than "15-reshaper_model_max_bin_idx" or "15-lmcs_delta_max_bin_idx," then the number of codewords for that piece is not signaled and is inferred to be zero. In other words, no codewords are assigned and no mapping/scaling is applied to the piece.

At the tile group header level or slice header level, another reshaper enable flag (e.g., "tile_group_reshaper_enable_flag" or "slice_lmcs_enabled_flag_") can be signaled to indicate if the LMCS process as depicted in FIG. 5 is applied to the target tile group or the target slice. If a reshaper is enabled for the target tile group or the target slice and if the target tile group or the target slice does not use dual tree partition, then a further chroma scaling enable flag can be signaled to indicate if chroma scaling is enable for the target tile group or the target slice. It is appreciated that dual tree partition is can also be referred to as chroma separate tree. In the following, the present disclosure will explain dual tree partition in more detail.

The piecewise linear model can be constructed based on the signaled syntax elements in Table 2 or Table 4 as follows. An i-th piece (i=0 . . . 15) of the "FwdMap" piecewise linear model can be defined by two input pivot points InputPivot [ ] and two mapped pivot points MappedPivot[ ]. The mapped pivot points MappedPivot[ ] can be an output of "FwdMap" piecewise linear model. The InputPivot[ ] and MappedPivot[ ] can be computed based on the signaled syntax as follows, assuming the bit depth of the exemplary input video is 10-bit. It is appreciated that the bit depth can be different from 10-bit.

a) Using syntax elements in Table 2:
  1) OrgCW=64
  2) For i=0:16, InputPivot[i]=i*OrgCW
  3) For i=reshaper_model_min_bin_idx:reshaper_model_max_bin_idx, SignaledCW[i]=OrgCW+(1¬2*_reshape_model_bin_delta_sign_CW[i])*reshape_model_ bin_delta_abs_CW[i];
  4) For i=0:16, MappedPivot[i] is calculated as follows:
    MappedPivot[0]=0;
    for (i=0; i<16; i++)
      MappedPivot[i+1]=MappedPivot[i]+SignaledCW[i]
b) Using syntax elements in Table 4:
  1) OrgCW=64
  2) For i=0:16, InputPivot[i]=i*OrgCW
  3) For i=lmcs_min_bin_idx:lmcsl_max_bin_idx, SignaledCW[i]=OrgCW+(1¬2*lmcs_bin_delta_sign_CW [i])*lmcsl_bin_delta_abs_CW[i];
  4) For i=0:16, MappedPivot[i] is calculated as follows:
    MappedPivot[0]=0;
    for (i=0; i<16; i++)
      MappedPivot[i+1]=MappedPivot[i]+SignaledCW[i]

The inverse mapping function "InvMap" is also defined by InputPivot[ ] and MappedPivot[ ]. Different from "FwdMap," for the "InvMap" piecewise linear model, the two input pivot points of each piece are defined by MappedPivot[ ] and the two output pivot points are defined by InputPivot[ ]. In this way, the input of the "FwdMap" is partitioned into equal pieces, but the input of the "InvMap" is not guaranteed to be partitioned into equal pieces.

As shown in FIG. 5, for an inter-coded block, motion compensated prediction can be performed in the mapped domain. In other words, after the motion-compensated prediction 516, $Y_{pred}$ is calculated based on the reference signals in the DPB, the "FwdMap" function 518 can be applied to map the luma prediction block in the original domain to the mapped domain, $Y'_{pred}$=FwdMap($Y_{pred}$). For an intra-coded block, the "FwdMap" function is not applied because the reference samples used in intra prediction are already in the mapped domain. After reconstructed block 506, $Y_r$ can be calculated. The "InvMap" function 508 can be applied to convert the reconstructed luma values in the mapped domain back to the reconstructed luma values in the original domain ($\hat{Y}_i$=InvMap($Y_r$)). The "InvMap" function 508 can be applied to both intra- and inter-coded luma blocks.

The luma mapping process (forward or inverse mapping) can be implemented using either look-up-tables (LUT) or using on-the-fly computation. If LUT is used, then tables "FwdMapLUT[ ]" and "InvMapLUT[ ]" can be pre-calculated and pre-stored for use at the tile group level or the slice level, and forward and inverse mapping can be simply implemented as FwdMap($Y_{pred}$)=FwdMapLUT[$Y_{pred}$] and InvMap($Y_r$)=InvMapLUT[$Y_r$], respectively.

Alternatively, on-the-fly computation can be used. Take forward mapping function "FwdMap" as an example. In order to determine a piece to which a luma sample belongs, the sample value can be right shifted by 6 bits (which corresponds to 16 equal pieces assuming 10-bit video) to obtain the piece index. Then, the linear model parameters for that piece are retrieved and applied on-the-fly to compute the mapped luma value. The "FwdMap" function is evaluated as follows:

$$Y'_{pred}=FwdMap(Y_{pred})=((b2-b1)/(a2-a1))*(Y_{pred}-a1)+b1$$

wherein "i" is the piece index, a1 is InputPivot[i], a2 is InputPivot[i+1], b1 is MappedPivot[i], b2 is MappedPivot [i+1].

The "InvMap" function can be computed on-the-fly in a similar manner, except that conditional checks need to be applied instead of a simple right bit-shift when figuring out the piece to which the sample value belongs, because the pieces in the mapped domain are not guaranteed to be equal sized.

In some embodiments, a method for process video content using luma-dependent chroma residual scaling can be provided.

Chroma residual scaling can be used to compensate for the interaction between a luma signal and chroma signals corresponding to the luma signal. Whether chroma residual scaling is enabled can also be signaled at the tile group level or the slice level. As shown in Table 1 of FIG. 6 and Table 3 of FIG. 8, if luma mapping is enabled and if dual tree partition is not applied to the current tile group, an additional flag (e.g., "tile_group_reshaper_chroma_residual_scale_flag" or "slice_chroma_residual_scale_flag") can be signaled to indicate if luma-dependent chroma residual scaling is enabled. When luma mapping is not used or dual tree partition is used in the target tile group (or the target slice), luma-dependent chroma residual scaling can be disabled accordingly. Further, luma-dependent chroma residual scaling can be disabled for chroma blocks whose area is less than or equal to 4.

Chroma residual scaling depends on an average value of a luma prediction block (for both intra- and inter-coded blocks) corresponding to the chroma signals. The average of the luma prediction block "avgr" can be determined using an equation below.

$$avgY' = \frac{\sum_{i=0}^{width-1} \sum_{j=0}^{height-1} predSamples[i][j]}{width * height}$$

A value of a chroma scaling factor for chroma residual scaling "$C_{ScaleInv}$" can be determined using steps as below.
  1) Find the index $Y_{Idx}$ of the piecewise linear model to which avgY' belongs based on the InvMap function.
  2) $C_{ScaleInv}$=cScaleInv[$Y_{Idx}$], where cScaleInv[ ] is a pre-computed LUT having e.g., 16 pieces.

In some embodiments, in the LMCS method, the pre-computed LUT "cScaleInv[i]" with i in a range of 0 to 15 can be derived based on a 64-entry static LUT "Chroma-ResidualScaleLut" and signaled codewords "SignaledCW [i]" value, as below.

ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

shiftC=11 if (SignaledCW[i] 0)

cScaleInv [i]=(1<<shiftC)

Otherwise, cScaleInv [i]=ChromaResidualScaleLut[(SignaledCW[i]>>1)−1]

As an example, assuming the input is 10-bit, the static LUT "ChromaResidualScaleLut[ ]" contains 64 entries, and the signaled codewords "SignaledCW[ ]" is in a range of [0, 128]. Therefore, a divide by 2 (or right shift by 1) is used to construct the chroma scaling factor LUT "cScaleInv [ ]". The LUT "cScaleInv [ ]" can be constructed at the tile group (or the slice level).

If the current block can be coded using intra, CIIP, or intra block copy (IBC) mode, avgY' can be determined as the average of the intra-, CIIP-, or IBC-predicted luma values. Otherwise, avgY' is computed as the average of the forward mapped inter predicted luma values (that is, Y'$_{pred}$ in FIG. 3), The IBC can also be referred to as a current picture referencing (CPR) mode. Unlike luma mapping, which is performed on the sample basis, "C$_{scaleInv}$" is a constant value for the entire chroma block. With "C$_{ScaleInv}$", chroma residual scaling can be applied at the decoder side as follows:

Decoder side: Ĉ$_{Res}$=Ĉ$_{ResScale}$*C$_{scaleInv}$

Where Ĉ$_{ResScale}$ is the reconstructed chroma residual of the current block. At the encoder side, the forward chroma residual scaling (before being transformed and quantized) is performed as follows: Encoder side: C$_{ResScale}$=C$_{Res}$*C$_{Scale}$=C$_{Res}$/C$_{ScaleInv}$.

In some embodiments, a method for processing video content using cross-component linear model prediction can be provided.

To reduce the cross-component redundancy, a cross-component linear model (CCLM) prediction mode can be used. In CCLM, chroma samples are predicted based on the reconstructed luma samples of a same coding unit (CU) by using a linear model as follows:

$$pred_C(i,j)=\alpha \cdot rec_L'(i,j)+\beta$$

where pred$_C$ (i, j) represents the predicted chroma samples in a CU and rec$_L$(i, j) represents the downsampled reconstructed luma samples of the same CU.

Linear model parameter α and β are derived based on the relation between luma values and chroma values from two sample positions. The two sample positions can include, among a set of downsampled neighboring luma samples, a first luma sample position with a maximum luma sample value and a second luma sample position with a minimum luma sample value, and their corresponding chroma samples. The linear model parameters a and are obtained according to the following equations.

$$\alpha = \frac{Y_a - Y_b}{X_a - X_b}$$

$$\beta = Y_b - \alpha \cdot X_b$$

Where Y$_a$ and X$_a$ represent luma value and chroma value of first luma sample position, respectively. And X$_b$ and Y$_b$ represent luma value and chroma value of the second luma sample position, respectively.

Figure 10:
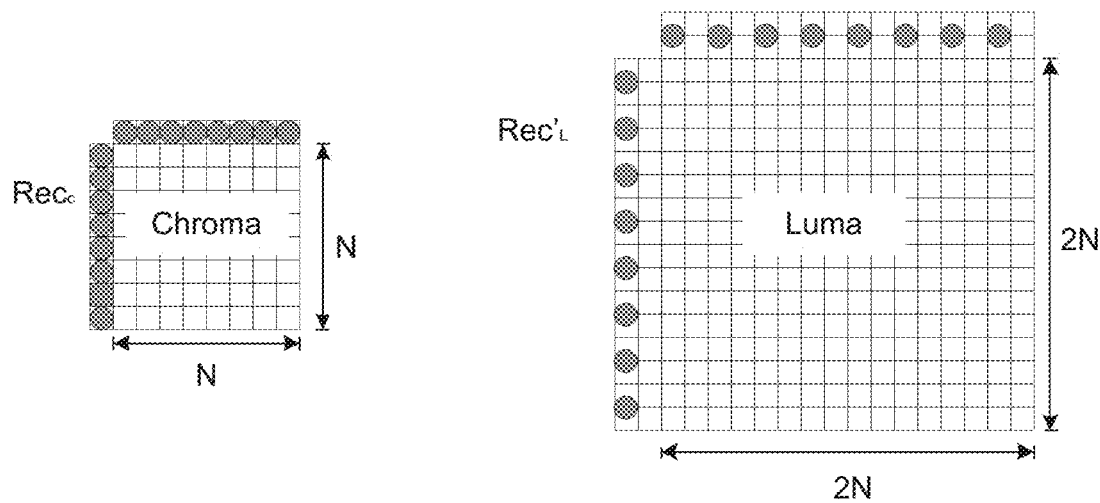
FIG. 10 illustrates an example of locations of samples used for derivation of a and (3, according to some embodiments of the disclosure.

FIG. 10 illustrates an example of sample positions involved in the CCLM mode, according to some embodiments of the disclosure.

The calculation of parameter α can be implemented with a look-up table. To reduce the memory required for storing the table, the diff value (difference between maximum and minimum values) and the parameter α are expressed by an exponential notation. For example, diff is approximated with a 4-bit significant part and an exponent. Consequently, the table for 1/diff is reduced into 16 elements for 16 values of the significand as follows:

DivTable[ ]={0,7,6,5,5,4,4,3,3,2,2,1,1,1,1,0}

The table "DivTable [ ]" can reduce the complexity of the calculation and also reduce the memory size required for storing the needed tables Besides the top positions and left positions can be used to calculate the linear model coefficients together, they also can be used alternatively in the other 2 LM modes, called LM_A, and LM_L modes.

In LM_A mode, only samples at top positions are used to calculate the linear model coefficients. To acquire more samples, the top positions can be extended to cover (W+H) samples. In LM_L mode, only samples at left positions are used to calculate the linear model coefficients. To get more samples, the left positions can be extended to cover (H+W) samples.

For a non-square block, the above template are extended to W+W, the left template are extended to H+H.

To match the chroma sample locations for 4:2:0 video sequences, two types of downsampling filters can be applied to luma samples to achieve 2 to 1 downsampling ratio in both horizontal and vertical directions. The selection of a downsampling filter can be specified by a SPS level flag. The two downsampling filters are as follows, which are corresponding to "type-0" and "type-2" content, respectively.

$$rec_L'(i, j) = \begin{bmatrix} rec_L(2i-1, 2j-1) + 2 \cdot rec_L(2i-1, 2j-1) + \\ rec_L(2i+1, 2j-1) + rec_L(2i-1, 2j) + 2 \cdot rec_L(2i, 2j) + \\ rec_L(2i+1, 2j) + 4 \end{bmatrix} \gg 3$$

$$rec_L'(i, j) = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + 4 \end{bmatrix} \gg 3$$

It is appreciated that only one luma line (general line buffer in intra prediction) is used to compute the downsampled luma samples when the upper reference line is at the CTU boundary.

This parameter computation can be performed as part of the decoding process, and is not just as an encoder search operation. As a result, no syntax is used to convey the α and β values to the decoder. The α and β parameters are computed for each of the chroma components, separately.

For chroma intra mode coding, a total of 8 intra modes can be allowed. Those modes include five traditional intra modes and three cross-component linear model modes (e.g., CCLM, LM_A, and LM_L). A process for signalling and deriving a chroma mode when CCLM is enabled is shown in Table 5 of FIG. 9. Chroma mode coding of a chroma block can depend on the intra prediction mode of a luma block corresponding to the chroma block. Because separate block partitioning structures for luma and chroma components are enabled in I slices (which will be described below), one chroma block can correspond to multiple luma blocks. Therefore, for chroma derived mode (DM), the intra prediction mode of the corresponding luma block covering the center position of the current chroma block is inherited.

In some embodiments, a method for processing video content using a dual tree partition can be provided.

In VVC draft, the coding tree scheme supports the ability for the luma and chroma to have separate block tree partitions. This is also referred to as dual tree partition. In VVC draft, signaling of dual tree partition is shown in Table 6 of FIG. 12) and Table 7 of FIG. 13. And later in VVC draft 5, dual tree partition is signaled as in Table 8 of FIG. 14 and Table 9 of FIG. 15). When a sequence level control flag signaled in the SPS (e.g., "qtbtt_dual_tree_intra_flag") is turned on and when a target tile group (or a target slice) is intra coded, block partition information can be signaled first for luma and then for chroma, separately. For inter coded tile groups/slices (e.g., P and B tile groups/slices), dual tree partition is not allowed. When separate block tree modes are applied, luma coding tree block (CTB) is partitioned into CUs by a first coding tree structure, and the chroma CTBs are partitioned into chroma CUs by a second coding tree structure, as shown in Table 7 of FIG. 13.

When luma and chroma blocks are allowed to have different partitions, problems may arise for coding tools that have dependency between the different color components. For example, when LMCS is applied, an average value of a luma block corresponding to a target chroma block can be used to determine a scaling factor to be applied on the target chroma block. When dual tree partition is used, determination of the average value of the luma block can create a latency of an entire CTU. For example, if the luma block of the CTU is split vertically once, and the chroma block of the CTU is split horizontally once, then both of the luma blocks of the CTU are decoded for calculating the average value, before the first chroma block of the CTU can be decoded. In VVC, the CTU can be as large as 128×128 in units of luma samples, causing latency of decoding the chroma block to increase significantly. Therefore, VVC draft 4 and draft 5 can prohibit the combination of dual tree partition and luma-dependent chroma scaling. When dual tree partition is enabled for the target tile group (or target slice), chroma scaling can be forced to be off. Note that the luma mapping part of LMCS is still allowed in dual tree partition, as it operates only on the luma components and has no cross color component dependency problem.

Another example of a coding tool that relies on the dependency between the color components to achieve better coding efficiency is called the cross component linear model (CCLM), which has been discussed above. In CCLM, neighboring luma and chroma reconstructed samples can be used to derive cross component parameters. And the cross component parameters can be applied to the corresponding reconstructed luma sample of the target chroma block to derive predictors for the chroma components. When dual tree partition is used, the luma and chroma partitions are not guaranteed to be aligned. Thus, CCLM cannot be started for a chroma block until all of the corresponding luma blocks that contain samples used in CCLM have been reconstructed.

Figure 16A:
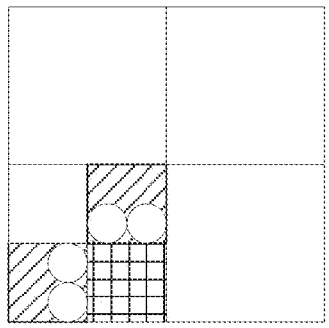
FIG. 16A illustrates an exemplary chroma tree partition, according to some embodiments of the disclosure.
Figure 16B:
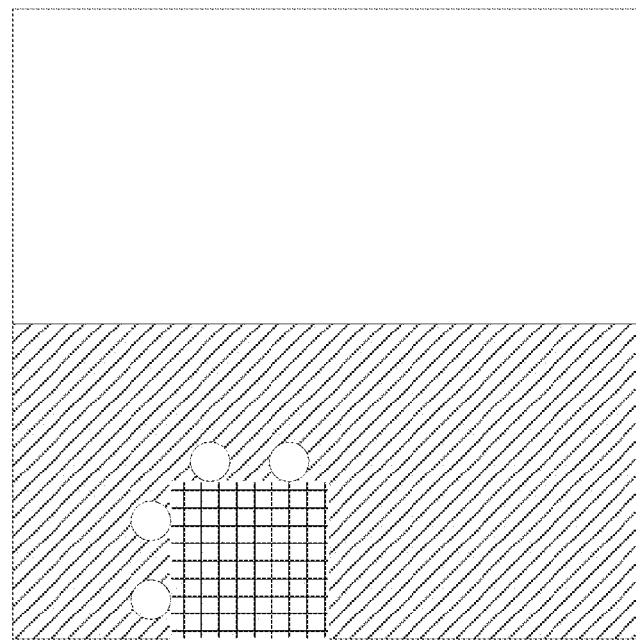
FIG. 16B illustrates an exemplary luma tree partition, according to some embodiments of the disclosure.

FIGS. 16A-16B illustrate an exemplary chroma tree partition and an exemplary luma tree partition, according to some embodiments of the disclosure. FIG. 16A illustrates an exemplary partitioning structure of a chroma block 1600. And FIG. 16B illustrates an exemplary partitioning structure of a luma block 1610 corresponding to chroma block 1600 of FIG. 16. In FIG. 16A, chroma block 1600 is quad-split into 4 sub-blocks and the bottom-left sub-block is further quad-split to 4 sub-blocks and the block with a grid pattern is current block to be predicted. In FIG. 16B, luma block 1610 is horizontally bi-split to 2 sub-blocks, the area with a grid pattern is the area corresponding to the target chroma block to be predicted. To derive the CCLM parameters, the neighboring reconstructed sample values represented by empty *circulars* are needed. Thus, the prediction of target chroma block cannot be started until the bottom luma block reconstruction is finished which introduces a large latency.

In some embodiments, a method for processing video content using virtual pipeline data units can be provided.

In VVC standardization, a concept of virtual pipeline data units (VPDUs) is introduced for more friendly hardware implementation. VPDUs are defined as non-overlapping M×M-luma(L)/N×N-chroma(C) units in a picture. In hardware decoders, successive VPDUs are processed by multiple pipeline stages at the same time. Different stages process different VPDUs simultaneously. The VPDU size is roughly proportional to the buffer size in most pipeline stages, and therefore, it is important to keep the VPDU size small. In VVC, the size of VPDU is set to 64×64 samples. Thus, all the coding tools adopted in VVC cannot violate the VDPU restriction. For example, the maximum transform size can only be 64×64, as the whole transform block need to be operated at same pipeline stage. Because of the VPDU restriction, the intra prediction block should also be no larger than 64×64. Therefore, in intra coded tile groups/slices (e.g., I tile groups/slices), the CTU is forced to be split into 4 64×64 blocks (if CTU is larger than 64×64) and each 64×64 block can be further split with a dual tree structure. Thus, a common root of the luma partitioning tree and the chroma partitioning tree is at the 64×64 block size when dual tree is enabled.

There are several problems in the current design of LMCS and CCLM.

First, for example, derivation of a tile group level chroma scaling factor LUT "cScaleInv[ ]" is not easily extensible. The derivation process currently depends on a constant chroma LUT "ChromaResidualScaleLut" with 64 entries. For a 10-bit video with 16 pieces, an additional step of division by 2 must be applied. When the number of pieces changes (for example, if 8 pieces instead of 16 pieces are used), then the derivation process must be changed to apply a division by 4 instead of 2. This additional step can cause precision loss.

Second, for example, to calculate the $Y_{Idx}$, which is used to obtain the chroma scaling factor, the average value of the entire luma block is used. Considering the maximum CTU size of 128×128, the average luma value can be calculated based on 16384 (128×128) luma samples, which is complex. Further, if a luma block partition of 128×128 is selected by the encoder, that block is more likely to contain homogenous content. Therefore, a subset of the luma samples in the block can be sufficient for calculating the luma average.

Third, during dual tree partition, the chroma scaling is set to be off to avoid potential pipeline issues for hardware decoders. However, this dependency can be avoided if explicit signaling is used to indicate the chroma scaling factor to be applied (instead of using the corresponding luma samples to derive it). Enabling chroma scaling in intra coded tile groups/slices can further improve coding efficiency.

Fourth, conventionally, a delta codeword value is signaled for each of the 16 pieces. It has been observed that often only a limited number of different codewords is used for the 16 pieces. Therefore, signaling overhead may be further reduced.

Fifth, the parameters of CCLM are derived with luma and chroma reconstructed samples from the blocks that are causal neighbors of target chroma blocks. In dual tree partitions, the luma and chroma block partitions are not necessarily aligned. Therefore, more than one luma block or a luma block with larger area than a target chroma block can correspond to the target chroma block. To derive the CCLM parameters of the target chroma block, all of the corresponding luma blocks must be reconstructed first as shown in FIGS. 16A-16B. This incurs latency in pipeline implementation and decreases the throughput of a hardware decoder.

To Address the above problems, embodiments of the disclosure are provided as below.

Embodiments of the disclosure provide a method for processing video content by removing chroma scaling LUT.

As mentioned above, the chroma LUT of 64 entries is not easily extensible and can cause problems when other piecewise linear models are used (e.g., 8 pieces, 4 pieces, 64 pieces, etc). It is also unnecessary because the chroma scaling factor can be set the same as the luma scaling factor of that corresponding piece to achieve the same coding efficiency. In some embodiments of this disclosure, denote $Y_{Idx}$ as the piece index of the current chroma block, the following steps are used to determine the chroma scaling factor:

if $Y_{Idx}$>reshaper_model_max_bin_idx or $Y_{Idx}$<reshaper_model_min_bin_idx, or if SignaledCW[$Y_{Idx}$]=0, then set chroma_scaling to default, chroma_scaling=1.0, i.e., no scaling is applied.

Otherwise, set chroma_scaling to SignaledCW[$Y_{Idx}$]/OrgCW.

The chroma scaling factor derived above has fractional precision. Fixed point approximation can be applied to avoid dependency on hardware/software platforms. Also, at the decoder side, inverse chroma scaling needs to be performed. Such division can be implemented by fixed point arithmetic using multiplication followed by right shift. Denote the number of bits in the fixed point approximation as CSCALE_FP_PREC. The following may be used to determine the inverse chroma scaling factor in fixed point precision:

inverse_chroma_scaling[$Y_{Idx}$]=((1<<(luma_bit_depth− log 2(TOTAL_NUMBER_PIECES)+CSCALE_FP_PREC))+(SignaledCW[$Y_{Idx}$]>>

1))/SignaledCW[$Y_{Idx}$];

where luma_bit_depth is the luma bit depth, TOTAL_NUMBER_PIECES is total number of pieces in the piecewise linear model, which is set to 16 in VVC draft 4. Note that inverse_chroma_scaling values may only need to be calculated once per tile group/slice, and the division in the above is an integer division operation.

Further quantization may be applied to derive the chroma scaling and inverse scaling factor. For example, the inverse chroma scaling factor may be calculated for all the even (2×m) values of SignaledCW, and the odd (2×m+1) values of the SignaledCW reuses the chroma scaling factor of the neighboring even value's scaling factor. In other words, the following may be used:

```
for(i = reshaper_model_min_bin_idx; i <= reshaper_model_max_bin_idx; i++)
{
  tempCW = SignaledCW[i] >> 1)<<1;
  inverse_chroma_scaling[i] = ((1 << (luma_bit_depth - log2(TOTAL_NUMBER_ PIECES ) + CSCALE_FP_PREC)) + (tempCW >> 1)) / tempCW;
}
```

The above embodiments of quantizing the chroma scaling factors can be further generalized, for example, the inverse chroma scaling factor may be calculated for every n-th value of SignaledCW, with all other neighboring values sharing the same chroma scaling factor. For example, "n" may be set to 4, meaning that every 4 neighboring codeword values share the same inverse chroma scaling factor value. It is desirable for the value of "n" to be a power of 2, which allows shifting to be used to calculate division. Denote the value of log 2(n) as LOG 2_n, the above can be modified as follows: tempCW=SignaledCW[i]>>LOG 2_n)<<LOG 2_n.

Finally, the value of LOG 2_n may be a function of the number of pieces used in the piecewise linear model. It is beneficial to use a larger LOG 2_n if fewer pieces are used. For example, LOG 2_n can be set to 1+(4−log 2(TOTAL_NUMBER_PIECES)) if the value of TOTAL_NUMBER_PIECES is smaller or equal to 16. If TOTAL_NUMBER_PIECES is larger than 16, then LOG 2_n can be set to 0.

Embodiments of the disclosure provide a method for processing video content by simplifying the averaging of luma prediction block.

As discussed above, to determine a piece index of the current chroma block "$Y_{Idx}$," the average value of the corresponding luma block can used. However, for large block sizes, the averaging process can involve a large number of luma samples. In a worst case, 128×128 luma samples can be involved in the averaging process.

Embodiments of the disclosure provide a simplified averaging process to reduce the worst case to only using N×N luma samples (N is a power of 2).

In some embodiments, if not both dimensions of a two-dimensional luma block are less than or equal to a preset threshold N (in other words, at least one of the two dimension is larger than N) a "downsampling" can be applied to use only N positions in that dimension. Without loss of generality, take the horizontal dimension as an example. If width is larger than N, then only samples at position x, x=i×(width>>log 2(N)), i=0, . . . N−1, are used in averaging.

Figure 17:
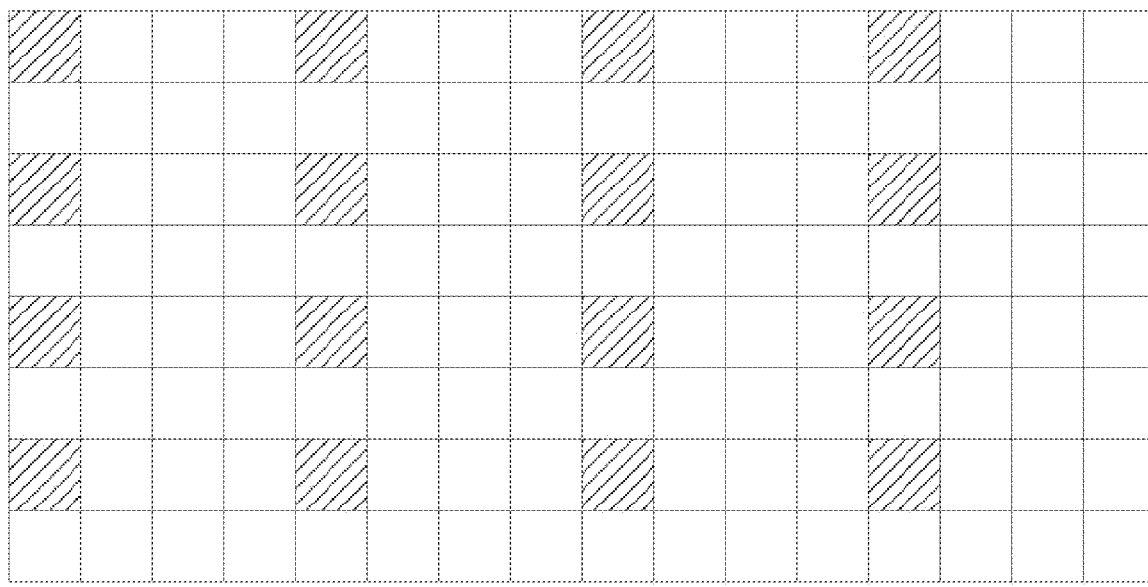
FIG. 17 illustrates an exemplary simplification of an averaging operation, according to some embodiments of the disclosure.

FIG. 17 illustrates an exemplary simplification of an averaging operation, according to some embodiments of the disclosure. In this example, N is set to 4, and only 16 luma samples (the shaded samples) in the block are used in averaging. It is appreciated that the value of N is not limited to 4. For example, N can be set to be any values that are powers of 2. In other words, N may be 1, 2, 4, 8, etc.

In some embodiments, different values of N may be applied in the horizontal and the vertical dimension. In other words, the worst case of the averaging operation can be using N×M samples. In some embodiments, the number of samples can be limited in the averaging process without considering the dimension. For example, a maximum of 16 samples can be used. The 16 samples can be distributed in the horizontal or vertical dimension in a form of 1×16, 16×1, 2×8, 8×2, 4×4, or a form that fits the shape of the target block. For example, 2×8 is used if the block is narrow and tall, 8×2 is used if the block is wide and short, and 4×4 is used when the block is square.

Although such a simplification can cause the average value to be different from the true average of the entire luma block, any such difference is likely small. This is because when large block size is selected, the content within the block tends to be more homogeneous.

Moreover, the decoder-side motion vector refinement (DMVR) mode is a complicated process in the VVC standard, especially for the decoder. This is because DMVR requires the decoder to perform motion search to derive the motion vector, before motion compensation can be applied. The bi-directional optical flow (BDOF) mode in the VVC standard can further complicate the situation, because BDOF is an additional sequential process that needs to be applied after DMVR, in order to obtain a luma prediction block. Because chroma scaling requires the average value of the corresponding luma prediction block, DMVR and BDOF can be applied before the average value can be calculated, causing a latency issue.

To solve this latency issue, in some embodiments of this disclosure, the luma prediction block is used before DMVR and BDOF to calculate the average luma value, and the average luma value is used to obtain the chroma scaling factor. This allows chroma scaling to be applied in parallel to the DMVR and BDOF processes, and therefore can significantly reduce latency.

Consistent with the present disclosure, variations of the latency reduction can be contemplated. In some embodiments, this latency reduction can also be combined with the simplified averaging process discussed above that uses only a portion of the luma prediction block to calculate the average luma value. In some embodiments, the luma prediction block can be used after the DMVR process and before the BDOF process to calculate the average luma value. The average luma value is then used to obtain the chroma scaling factor. This design allows chroma scaling to be applied in parallel to the BDOF process while keeping the accuracy of determining the chroma scaling factor. The DMVR process can refine the motion vector, and therefore, using the prediction sample with the refined motion vector after the DMVR process can be more accurate than using the prediction sample with the motion vector before the DMVR process.

Moreover, in the VVC standard, the CU syntax structure (e.g., coding_unit( )) can include a syntax element "cu_cbf" to indicate if there is any non-zero residual coefficients in a target CU. At the TU level, the TU syntax structure transform_unit( ) includes syntax elements tu_cbf_cb and tu_cbf_cr to indicate if there is any non-zero chroma (Cb or Cr) residual coefficients in the target TU. In the VVC draft 4, the averaging of the corresponding luma block can be invoked if chroma scaling is enabled at the tile group level or the slice level. The present disclosure also provides a method to bypass the luma averaging process. Consistent with the disclosed embodiments, because the chroma scaling process is applied to the residual chroma coefficients, the luma averaging process can be bypassed if there is no non-zero chroma coefficients. This can be determined based on the following conditions:

Condition 1: cu_cbf is equal to 0
Condition 2: tu_cbf_cr and tu_cbf_cb are both equal to 0
When either Condition 1 or Condition 2 is met, the luma averaging process can be bypassed.

In the above embodiment, only N×N samples of the prediction block are used to derive the average value, which simplifies the averaging process. For example, when N is equal to 1, only the top left sample of the prediction block can be used. However, even this simplified case requires the prediction block to be generated first, thereby creating latency. Therefore, in some embodiments, it contemplated that the reference luma samples can be used directly to derive the chroma scaling factor. This allows the decoder to derive the chroma scaling factor in parallel to the luma prediction process, thus reducing latency. In other words, the intra prediction and the inter prediction are processed separately.

In the case of intra prediction, the already decoded neighboring samples in a same picture can be used as reference samples to generate the prediction block. These reference samples include samples on the top of the target block, to the left of the target block, and to the top-left of the target block. The average of all these reference samples can be used to derive the chroma scaling factor. Alternatively, the average of only a portion of these reference samples can be used. For example, only M reference samples (e.g., M=3) closest to the top-left position of the target block can be averaged.

Figure 18:
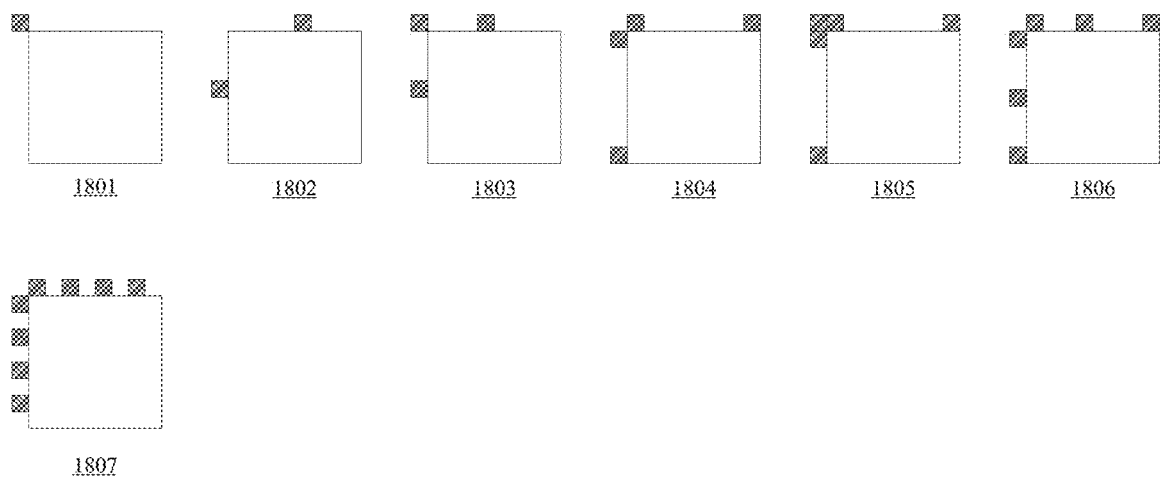
FIG. 18 illustrates examples of samples used in average calculation to derive a chroma scaling factor, according to some embodiments of the disclosure.

As another example, the M reference samples which are averaged to derive the chroma scaling factor are not closest to the top-left position but are distributed along the top boundary and left boundary of the target block as in FIG. 18. FIG. 18 illustrates exemplary samples used in an average calculation to derive the chroma scaling factor. As shown in FIG. 18, the exemplary samples are represented in solid dashed boxes. One, two, three, four, five, six and eight samples are averaged in each of exemplary blocks 1801-1807 shown in FIG. 18. The average calculation in this disclosure can be replaced with a weighted average where different samples can have different weights in the average calculation. For example, a sum of weights can be a power of 2 to avoid division operation in the average calculation.

In the case of inter prediction, reference samples from temporal reference pictures can be used to generate the prediction block. These reference samples are identified by the reference picture indices and the motion vectors. Interpolation can be applied if the motion vectors have fractional precision. To calculate the average of reference samples, the reference samples after interpolation may be used, or the reference samples before interpolation (that is, motion vectors that are clipped to integer precision) may also be used. Consistent with the disclosed embodiments, all of the reference samples may be used to calculate the average. Alternatively, only a portion of the reference samples (e.g., reference samples corresponding to the top-left position of the target block) may be used to calculate the average.

As shown in FIG. 5, intra prediction is performed in the reshaped domain, while inter prediction is performed in the original domain. Therefore, for inter prediction, a forward mapping is applied on the prediction block, and the luma prediction block after forward mapping is used to calculate an average value of the luma block. To reduce latency, the average value can be calculated using the luma prediction block before forward mapping. For example, the whole luma block before forward mapping, or a N×N portion of the luma block before forward mapping, or the top-left sample of the luma block before forward mapping can be used.

Embodiments of the disclosure further provide a method for processing video content with chroma scaling for dual-tree partitions.

Because the dependency on the luma block can cause hardware design complications, chroma scaling can be turned off for intra-coded tile groups/slices that enable dual-tree partitions. However, this restriction can cause coding efficiency loss.

Because a CTU is a common root of both a luma coding tree and a chroma coding tree, deriving a chroma scaling factor on CTU level can remove the dependency between chroma and luma in dual tree partitions. For example, the CTU neighboring reconstructed luma samples or chroma samples are used to derive a chroma scaling factor. Then, this chroma scaling factor can be used for all the chroma samples within the CTU. In this example, the method of averaging reference samples above can be applied to average the CTU neighboring reconstructed samples. The average of all these reference samples can be used to derive the chroma scaling factor. Or, the average value of only a portion of these reference samples can be used. For example, only M reference samples (e.g., M=4, 8, 16, 32 or 64) closest to the top-left position of the target block can be averaged.

Figure 19:
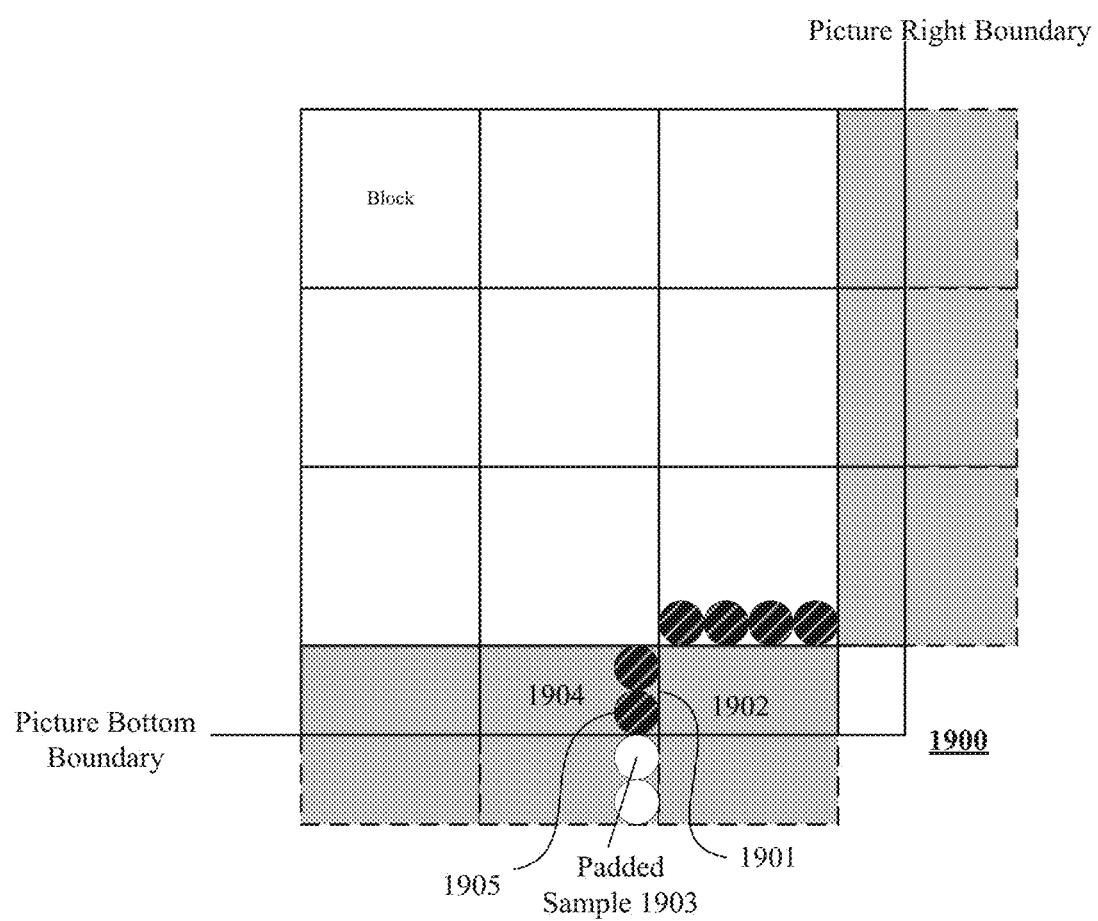
FIG. 19 illustrates an example of chroma scaling factor derivation for blocks at picture right or bottom boundary, according to some embodiments of the disclosure.

However, for the CTUs on the picture bottom or right boundary, all the samples of the CTUs may not be within the picture boundary as grey CTUs in FIG. 19. In this case, only the neighboring reconstructed samples on the CTU boundary within the picture boundary (grey samples in FIG. 19) can be used to derive the chroma scaling factor. But a variable number of samples in average calculation requires a division operation which is undesirable in hardware implementation. Therefore, embodiments of the disclosure provide a method of padding the picture boundary samples to a fixed number that is a power of 2, so that the division operation in average calculation can be avoided. For example, as shown in FIG. 19, the padded samples out of a picture bottom boundary (white samples in FIG. 19) are generated from a sample 1905 that is a sample that is closest to the padded samples among all the samples on the picture bottom boundary. In additional to the CTU level chroma scaling factor derivation, the chroma scaling factor can be derived on a fixed grid. Considering the Virtual Pipeline Data Unit (VPDU) which is defined as a data unit processed by pipeline stages, a chroma scaling factor can be derived in VPDU level. In the VVC draft 5, VPDU is defined as 64×64 blocks on the luma sample grid. Therefore, chroma scaling factor derivation at the granularity of 64×64 blocks is provided in embodiments of this disclosure. In the VVC draft 6, VPDU is defined as M×M blocks on the luma sample gird wherein M is the smaller one of a CTU size and 64. The CTU level derivation method explained before can also be used at the VPDU level.

In some embodiments, on top of deriving the chroma scaling factor on a fixed grid with a grid size being smaller than a CTU, the factor is derived only once per CTU and used for all grid units (e.g., VPDU) within the CTU. For example, deriving the chroma scaling factor on the first VPDU of a CTU and the factor is used for all the VPDUs within the CTU. It is appreciated that the method on the VPDU level is equivalent to the CTU level derivation using a limited number of neighboring samples in the derivation (e.g., using only neighboring samples corresponding to the first VPDU in the CTU).

Instead of averaging the sample values of a corresponding luma block to calculate avgY' at the CTU level, at the VPDU level, or at any other fixed-size block unit level, determining the piece index $Y_{Idx}$, and obtaining the chroma scaling factor inverse chroma scaling[$Y_{Idx}$], the chroma scaling factor can also be explicitly signaled in the bitstream to avoid the dependency on luma in the case of dual tree partition.

The chroma scaling index can be signaled at a plurality of levels. For example, the chroma scaling index can be signaled at the coding unit (CU) level, together with the chroma prediction mode, as shown in Table 10 of FIG. 20 and Table 11 of FIG. 21. The syntax element lmcs scaling factor idx (element 2002 in FIG. 20 and element 2102 in FIG. 21) is used to determine the chroma scaling factor for the target chroma block. When it is not present, the chroma scaling factor for the target chroma block is inferred to be equal to 1.0 in floating point precision or equivalently (1<<CSCALE_FP_PREC) in fixed point precision. The range of allowed values for lmcs_chroma_scaling_idx can be determined at a tile group level or a slice level, and will be discussed later.

Depending on the possible values of lmcs_chroma_scaling_idx, its signaling cost can be too high, especially for small blocks. Therefore, in some embodiments of this disclosure, the signaling condition in Table 10 of FIG. 20 can additionally include block size conditions. For example, this syntax element of "lmcs_chroma_scaling_idx" (element 2002 in FIG. 20) is only signaled, if the target block contains more than N chroma samples or if the target block has a width larger than a given width W and/or a height larger than a given height H. For smaller blocks, if the lmcs_chroma_scaling_idx is not signaled, then its chroma scaling factor can be determined at the decoder side. As an example, the chroma scaling factor can be set to 1.0 in floating point precision. In some embodiments, a default lmcs_chroma_scaling_idx value can be added at the tile group header level or the slice header level (Table 1 of FIG. 10). Blocks that having no signaled lmcs_chroma_scaling_idx (e.g., small blocks) can use the tile group/slice level default index to derive a chroma scaling factor corresponding to the blocks. In some embodiments, the chroma scaling factor of a small block can be inherited from neighbors (e.g., top or left neighbors) of the small block, which have explicitly signaled scaling factors.

Besides signaling this syntax element of "lmcs_chroma_scaling_idx" at the CU level, it can also be signaled at the CTU level. However, when the maximum CTU size is 128×128 in VVC, chroma scaling according to the signaled syntax element of "lmcs_chroma_scaling_idx" at the CTU level can be too coarse. Therefore, in some embodiments of this disclosure, this syntax element of "lmcs_chroma_scaling_idx" can be signaled using fixed granularity. For example, for an area with 16×16 samples (or, an area with 64×64 samples for VPDU), one lmcs_chroma_scaling_idx can signaled and applied to samples in the area with 16×16 samples (or, the area with 64×64 samples).

The range of lmcs_chroma_scaling_idx for the target tile group/slice depends on how many chroma scaling factor values are allowed in the target tile group/slice. The range of lmcs_chroma_scaling_idx can be determined by the existing method in VVC that relies on the 64-entry chroma LUT as discussed above. Alternatively, it can also be determined using the chroma scaling factor calculation discussed above.

As an example, the value of LOG 2_n is set to 2 (i.e., "n" is set to 4) for the "quantization" method described above, and the codeword assignment of each piece in the piecewise linear model of the target tile group/slice is set as follows: {0, 65, 66, 64, 67, 62, 62, 64, 64, 64, 67, 64, 64, 62, 61, 0}. Then there are only 2 possible scaling factor values for the entire tile group, because any codeword value from 64 to 67 can have a same scaling factor value (e.g., 1.0 in fractional precision), and any codeword values from 60 to 63 can have the same scaling factor value (e.g., 60/64=0.9375 in factional precision). For the two end pieces having no codeword assigned to them, the chroma scaling factor can be set to 1.0 by default. Therefore, in this example, one-bit is sufficient to signal lmcs_chroma_scaling_idx for blocks in the target slice. The block can include a CU, a CTU, or a fixed area depending on the chroma scaling factor signaling level.

Other than deriving the number of possible chroma scaling factor values using the piecewise linear model, in some embodiments, the encoder can signal a set of chroma scaling factor values at the tile group/slice header. Then, at the block level, the chroma scaling factor value can be determined using this set and the lmcs_chroma_scaling_idx value for that block.

Alternatively, to reduce the signaling cost, the chroma scaling factor can be predicted from the neighboring blocks. For example, a flag can be used to indicate that the chroma scaling factor of the target block is equal to that of a neighboring block of the target block. The neighboring block can be a top or left neighboring block. Thus, up to 2 bits can be signaled for a target block. For example, in the 2 bits, a first bit can indicate whether the chroma scaling factor of the target block is equal to that of a left neighbor of the target block, and a second bit can indicate whether the chroma scaling factor of the target block is equal to a top neighbor of the target block. If the values of neither bits indicate the chroma scaling factor of the target block is equal to the top neighbor or the left neighbor, then the lmcs_chroma_scaling_idx syntax can be signaled.

Dependent on the possibility of different values of "lmcs_chroma_scaling_idx," variable length codewords can be used to "code lmcs_chroma_scaling_idx" to reduce the average code length.

Context-Based Adaptive Binary Arithmetic Coding (CABAC) can be applied to code "lmcs_chroma_scaling_idx" of a target block. CABAC context associated with the target block can depend on "lmcs_chroma_scaling_idx" of neighboring blocks of the target block. For example, a left neighboring block or a top neighboring block can be used to form the CABAC context. In terms of binarization of "lmcs_chroma_scaling_idx," truncated Rice binarization can be used to binarize "lmcs_chroma_scaling_idx."

By signaling the "lmcs_chroma_scaling_idx," the encoder can select an adaptive lmcs_chroma_scaling_idx in terms of rate distortion cost. Accordingly, the lmcs_chroma_scaling_idx can be chosen using rate distortion optimization to improve coding efficiency, which could help to offset the signaling cost increase.

Embodiments of the disclosure further provide a method for processing video content with signaling a LMCS piecewise linear model.

Although the LMCS method in VVC draft 4 uses a piecewise linear model with 16 pieces, a number of unique values of SignaledCW[i] in a tile group/slice tends to be much less than 16. For example, some of the 16 pieces can use a default number of codewords "OrgCW," and some of the 16 pieces can have a same number of codewords as each other. Therefore, in signaling the LMCS piecewise linear model, a number of unique codewords can be signaled in a form of "listUniqueCW[ ]," and then, for each piece of the LMCS piecewise linear model, an index of the listUniqueCW[ ] can be sent for selecting a codeword for a target piece.

The modified syntax table is provided in Table 12 of FIG. 22, in which syntax elements 2202 and 2204, shown in italics, are revised according to the present embodiment.

Semantics of the disclosed signaling method are as follows, with changes being underlined:

reshaper_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshaper_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx—reshape_model_delta_max_bin_idx.

reshaper_model_bin_delta_abs_cw_prec_minus1 plus 1 specifies the number of bits used for the representation of the syntax reshape_model_bin_delta_abs_CW[i].

reshaper_model_bin_num_unique_cw_minus1 plus 1 specifies the size of the codeword array listUniqueCW.

reshaper_model_bin_delta_abs_CW[i] specifies the absolute delta codeword value for the i-th bin.

reshaper_model_bin_delta_sign_CW_flag[i] specifies the sign of reshape_model_bin_delta_abs_CW[i] as follows:
If reshape_model_bin_delta_sign_CW_flag[i] is equal to 0, the corresponding variable RspDeltaCW[i] is a positive value.
Otherwise (reshape_model_bin_delta_sign_CW_flag[i] is not equal to 0), the corresponding variable RspDeltaCW[i] is a negative value.

When reshape_model_bin_delta_sign_CW_flag[i] is not present, it is inferred to be equal to 0.

The variable RspDeltaCW[i] is derived as RspDeltaCW[i]=(1−2*reshape_model_bin_delta_sign_CW[i])*reshape_model_bin_delta_abs_CW[i]

The variable listUniqueCW[0] is set equal to OrgCW. The variable listUniqueCW[i] with i=1− . . . reshaper_model_bin_num_unique_cw_minus1, inclusive, is derived as follow:
The variable OrgCW is set equal to (1<<BitDepth$_Y$)/(MaxBinIdx+1).
listUniqueCW[i]=OrgCW+RspDeltaCW[i−1]

reshaper_model_bin_cw_idx[i] specifies the index of the array listUniqueCW[ ] used to derive RspCW[i]. The value of reshaper_model_bin_cw_idx[i] shall be in the range of 0 to (reshaper_model_bin_num_unique_cw_minus1+1), inclusive.

RspCW[i] is derived as follows:
If reshaper_model_min_bin_idx<=i<=reshaper_model_max_bin_idx
RspCW[i]=listUniqueCW[reshaper_model_bin_cw_idx[i] ].
Otherwise, RspCW[i]=0.

The value of RspCW[i] can be in the range of 32 to 2*OrgCW−1 if the value of BitDepth$_Y$ is equal to 10.

Embodiments of the disclosure provide a method for processing video content with conditional chroma scaling at a block level.

As shown in Table 1 of FIG. 6), whether chroma scaling is applied can be determined by the tile_group_reshaper_chroma_residual_scale_flag signaled at the tile group/slice level. However, it can be beneficial to determine whether to apply chroma scaling at the block level. For example, in some embodiments, a CU level flag can be signaled to indicate if chroma scaling is applied to the target block. Presence of the CU level flag can be conditioned upon the tile group level flag "tile_group_reshaper_chroma_residual_scale_flag." In other words, the CU level flag can be signaled only if chroma scaling is allowed at the tile group/slice level. While the CU level flag can allow the encoder to choose whether to use chroma scaling based on whether the chroma scaling is beneficial for the target block, it can also incur signaling overhead.

Consistent with the disclosed embodiments, to avoid the above signaling overhead, whether chroma scaling is applied to a block can be conditioned upon a prediction mode of the target block. For example, if the target block is inter predicted, the prediction signal tends to be good, especially if its reference pictures are closer in temporal distance. In this case, because the residual is expected to be very small, chroma scaling can be bypassed. For example, pictures in the higher temporal levels tend to have reference pictures that are close in temporal distance, and for blocks in these pictures using nearby reference pictures, chroma scaling can be disabled. The picture order count (POC) difference between the target picture and the target block's reference pictures can be used to determine if this condition is met.

In some embodiments, chroma scaling can be disabled for all inter coded blocks. In some embodiments, chroma scaling can be disabled for all intra coded blocks. In some embodiments, chroma scaling can be disabled for the combined intra/inter prediction (CIIP) mode, which is defined in the VVC standard.

In the VVC standard, the CU syntax structure "coding_unit( )" can include a syntax element "cu_cbf" to indicate if there is any non-zero residual coefficient in the target CU. At the TU level, the TU syntax structure "transform_unit( )" can include syntax elements "tu_cbf_cb" and "tu_cbf_cr" to indicate if there is any non-zero chroma (Cb or Cr) residual coefficients in the target TU. The chroma scaling process can be conditioned upon these flags. As explained above, the averaging of the corresponding luma chroma scaling process can be invoked if there is no non-zero residual coefficient, then the chroma scaling process can be bypassed, and the present disclosure provides a method to bypass the luma averaging process.

Embodiments of the disclosure provide a method for processing video content with CCLM parameters derivation.

As discussed earlier, in the VVC 5, the parameters of CCLM for prediction of the target chroma block are derived with the luma and chroma reconstructed samples from neighboring blocks. In the case of a dual tree, a luma block partition and a chroma block partitions can be unaligned. In other words, to derive the CCLM parameters for one NxM chroma block, multiple neighboring luma blocks or a luma block with size larger than 2Nx2M (in case of color format 4:2:0) can be reconstructed, thus incurring latency.

To reduce latency, as an example, the CCLM parameters are derived at the CTU/VPDU level. The reconstructed luma and chroma samples from neighboring CTUs/VPDUs can be used to derive the CCLM parameters. And derived parameters can be applied to all blocks within the CTU/VPDU. For example, formulas described in the cross-component linear model prediction can be used to derive the parameters with $X_a$ and $Y_a$ being a luma value and a chroma value of the luma sample position with maximum luma sample value among the CTU/VPDU neighboring luma samples, respectively. And $X_b$ and $Y_b$ represent the luma value and the chroma value of the luma sample position with minimum luma sample among the CTU/VPDU neighboring luma samples, respectively. To a person skilled in the art, any other derivation processes can be used in combination with the CTU/VPDU level parameter derivation concept proposed herein.

Besides CTU/VPDU level CCLM parameter derivation, such a derivation process can be performed on a fixed luma grid. In the VVC draft 5, when dual tree partitioning is used, separate luma and chroma partitions can start from 64×64 luma grid. In other words, the split from 128×128 CTU to 64×64 CU can be performed jointly and not separately for luma and chroma. Therefore, as another example, CCLM parameters can be derived on a 64×64 luma grid. The neighboring reconstructed luma and chroma samples of a 64×64 grid unit can be used to derive the CCLM parameters for all chroma blocks within the 64×64 grid unit. Compared to the CTU level derivation, which can be up to 128×128 in luma samples, a 64×64 unit level derivation can be more accurate, and still does not have the pipeline latency issue as in the current VVC draft 5. On top of this example, CCLM parameters derivation can be further simplified by skipping derivation for some girds. For example, CCLM parameters are only derived on the first 64×64 block within CTU and the derivation for following 64×64 blocks in the same CTU is skipped. The parameters derived based on first 64×64 block can be used for all the blocks within the CTU.

Figure 23:
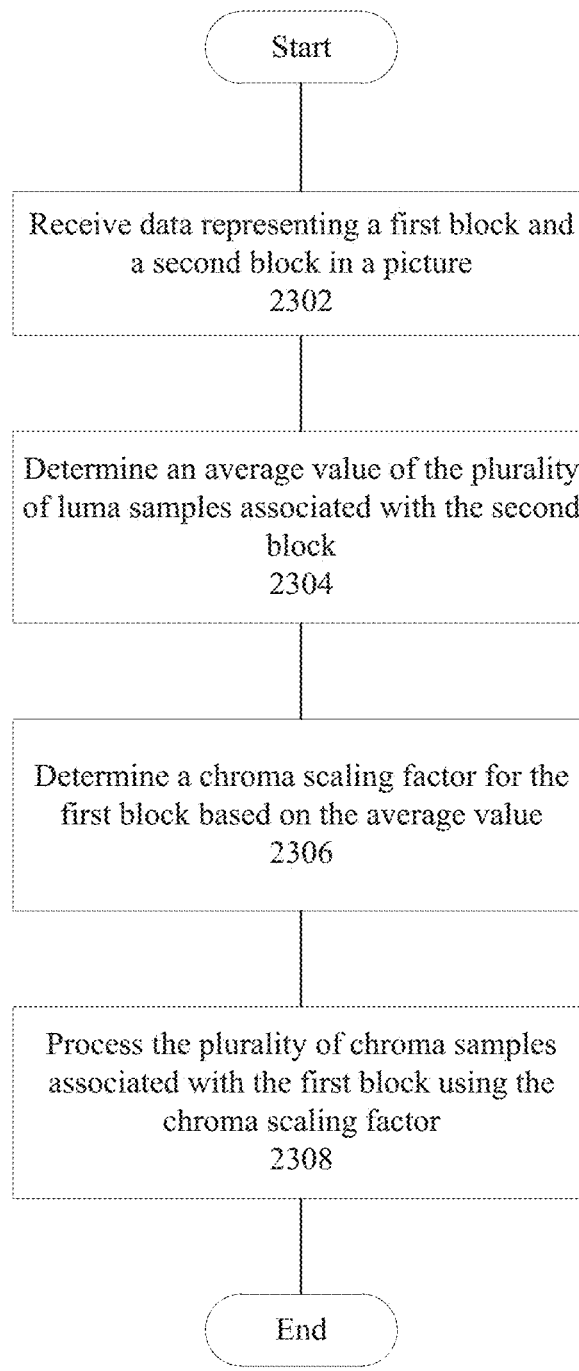
FIG. 23 is a flowchart of an exemplary method for processing video content, according to some embodiments of the disclosure.

FIG. 23 illustrates a flowchart of an exemplary method 2300 for processing video content, according to some embodiments of the disclosure. In some embodiments, method 2300 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a monitoring video sequence, which can be captured by a monitoring device (e.g., the video input device in FIG. 4) associated with a processor (e.g., processor 402) of the apparatus. The video sequence can include multiple pictures. The apparatus can perform method 2300 at the level of pictures. For example, the apparatus can process one picture at a time in method 2300. For another example, the apparatus can process a plurality of pictures at a time in method 2300. Method 2300 can include steps as below.

At step 2302, data representing a first block and a second block in a picture can be received. The plurality of blocks can include a first block and a second block. In some embodiments, the first block can be a target chroma block (e.g., chroma block 1600 of FIG. 16A), and the second block can be a coding tree block (CTB), a transform unit (TU), or a virtual pipeline data unit (VPDU). The virtual pipeline data unit is a non-overlapping unit in the picture with a size that is less than or equal to a size of a coding tree unit for the picture. For example, when a size of a CTU is 128×128 pixels, a VPDU can have a smaller size than that of the CTU, and the size (e.g., 64×64 pixels) of the VPDU can be proportional to a buffer size in most pipeline stages of the hardware (e.g., hardware decoders).

In some embodiments, the coding tree block can be a luma block (e.g., luma block 1610 of FIG. 16B) corresponding to the target chroma block. Accordingly, the data can include a plurality of chroma samples associated with the first block and a plurality of luma samples associated with the second block. The plurality of chroma samples associated with the first block comprises: a plurality of chroma residual samples within the first block.

At step 2304, an average value of the plurality of luma samples associated with the second block can be determined. The plurality of luma samples can include samples described with reference to FIGS. 18-19. As an example, as shown in FIG. 19, The plurality of luma samples can include a plurality of reconstructed luma samples (e.g., a shaded sample 1905 and a padded sample 1903) on a left boundary 1901 of the second block (e.g., 1902) or on a top boundary of the second block. It is appreciated that the plurality of reconstructed luma samples can belong to a neighboring reconstructed luma block (e.g., 1904).

Method 2300 can further include determining, among the plurality of luma samples associated with the second block, whether a first luma sample is out of a boundary of the picture; and in responding to a determination that the first luma sample is out of the boundary of the picture, setting a value of the first luma sample to a value of a second luma sample of the plurality of luma samples that is within the boundary of the picture. The boundary of the picture can include one of a right boundary of the picture and a bottom boundary of the picture. For example, it can be determined that padded sample 1903 is out of the picture bottom boundary, and therefore, the value of padded sample 1903 is set to be the value of shaded sample 1905 that is a sample closest to the padded sample 1903 among all the samples on the picture bottom boundary.

It is appreciated that when the second block (e.g., 1902) is across a boundary of a picture, padded samples (e.g., padded sample 1903) can be created, so that a number of the plurality of luma samples can be a fixed number that usually is a power of 2 to avoid divisional operations.

At step 2306, a chroma scaling factor for the first block can be determined based on the average value. As discussed above with reference to FIG. 18, in intra prediction, decoded samples in a neighboring block of the same picture can be used as reference samples to generate the prediction block. For example, the average value of the samples in a neighboring block can be used as a luma average value for determining a chroma scaling factor of a target block (e.g., the first block in this example), and the chroma scaling factor for the first block can be determined using the luma average value of the second block.

At step 2308, the plurality of chroma samples associated with the first block can be processed using the chroma scaling factor. As discussed above with reference to FIG. 5, a plurality of chroma scaling factors can construct a chroma scaling factor LUT at a tile group level, and be applied at a decoder side on the reconstructed chroma residual of a target block. Similarly, the chroma scaling factors can also be applied at an encoder side.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1. A computer-implemented method for processing video content, the method comprising:
   receiving data representing a first block and a second block in a picture, the data comprising a plurality of chroma samples associated with the first block and a plurality of luma samples associated with the second block;
   determining an average value of the plurality of luma samples associated with the second block;
   determining a chroma scaling factor for the first block based on the average value; and
   processing the plurality of chroma samples associated with the first block using the chroma scaling factor.

2. The method according to clause 1, wherein the plurality of luma samples associated with the second block comprises:
   a plurality of reconstructed luma samples on a left boundary of the second block or on a top boundary of the second block.

3. The method according to clause 2, further comprising:
   determining, among the plurality of luma samples associated with the second block, whether a first luma sample is out of a boundary of the picture; and
   in response to a determination that the first luma sample is out of the boundary of the picture, setting a value of the first luma sample to a value of a second luma sample of the plurality of luma samples that is within the boundary of the picture.

4. The method according to clause 3, further comprising:
   determining, among the plurality of luma samples associated with the second block, whether a first luma sample is out of a boundary of the picture; and
   in response to a determination that the first luma sample is out of the boundary of the picture, setting a value of the first luma sample to a value of a second luma sample of the plurality of luma samples that is on the boundary of the picture.

5. The method according to clause 4, wherein the boundary of the picture is one of a right boundary of the picture and a bottom boundary of the picture.

6. The method according to any one of clauses 1-5, wherein the second block is a coding tree block, a transform unit, or a virtual pipeline data unit, wherein a size of the virtual pipeline data unit is equal to or less than a size of a coding tree unit for the picture.

7. The method according to clause 6, wherein the virtual pipeline data unit is a non-overlapping unit in the picture.

8. The method according to any one of clauses 1-7, wherein the plurality of chroma samples associated with the first block comprises: a plurality of chroma residual samples within the first block.

9. The method according to any one of clauses 1-8, wherein the first block is a target chroma block, and the second block is a luma block corresponding to the target chroma block.

10. A system for processing video content, comprising:
    a memory for storing a set of instructions; and
    at least one processor configured to execute the set of instructions to cause the system to perform:
    receiving data representing a first block and a second block in a picture, the data comprising a plurality of chroma samples associated with the first block and a plurality of luma samples associated with the second block;
    determining an average value of the plurality of luma samples associated with the second block;

determining a chroma scaling factor for the first block based on the average value; and processing the plurality of chroma samples associated with the first block using the chroma scaling factor.

11. The system according to clause 10, wherein the plurality of luma samples associated with the second block comprises:
a plurality of reconstructed luma samples on a left boundary of the second block or on a top boundary of the second block.

12. The system according to clause 11, wherein the at least one processor is configured to execute the set of instructions to cause the system to further perform:
determining, among the plurality of luma samples associated with the second block, whether a first luma sample is out of a boundary of the picture; and
in response to a determination that the first luma sample is out of the boundary of the picture, setting a value of the first luma sample to a value of a second luma sample of the plurality of luma samples that is within the boundary of the picture.

13. The system according to clause 12, wherein the second luma sample is on the boundary of the picture.

14. The system according to clause 13, wherein the boundary of the picture is one of a right boundary of the picture and a bottom boundary of the picture.

15. The system according to any one of clauses 10-14, wherein the second block is a coding tree block, a transform unit, or a virtual pipeline data unit, wherein a size of the virtual pipeline data unit is equal to or less than a size of a coding tree unit for the picture.

16. The system according to clause 15, wherein the virtual pipeline data unit is a non-overlapping unit in the picture.

17. The system according to any one of clauses 10-16, wherein the plurality of chroma samples associated with the first block comprises: a plurality of chroma residual samples within the first block.

18. The system according to any one of clauses 10-17, wherein the first block is a target chroma block, and the second block is a luma block corresponding to the target chroma block.

19. A non-transitory computer readable medium that stores a set of instructions that is executable by at least one processor of a computer system to cause the computer system to perform a method for processing video content, the method comprising:
receiving data representing a first block and a second block in a picture, the data comprising a plurality of chroma samples associated with the first block and a plurality of luma samples associated with the second block;
determining an average value of the plurality of luma samples associated with the second block;
determining a chroma scaling factor for the first block based on the average value; and
processing the plurality of chroma samples associated with the first block using the chroma scaling factor.

20. The non-transitory computer readable medium according to clause 19, wherein the plurality of luma samples associated with the second block comprises:
a plurality of reconstructed luma samples on a left boundary of the second block or on a top boundary of the second block.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method of decoding a bitstream to output one or more pictures for a video stream, the method comprising:
determining, based on encoded syntax elements in the bitstream, a chroma scaling factor associated with a target coding block; and
performing chroma residual scaling of the target coding block using the chroma scaling factor,
wherein the chroma scaling factor is determined based on N luma samples, the N being independent of a size of the target coding block,
wherein the N luma samples are determined based on a first coding block associated with the target coding block, and wherein when one or more of the N luma samples are outside a boundary of a picture, the one or more of the N luma samples are replaced with a luma sample on the picture boundary.

2. The method of claim 1, wherein the encoded syntax elements include an index signaling the chroma scaling factor or being used for deriving the chroma scaling factor.

3. The method of claim 1, wherein the luma sample on the picture boundary:
is determined from a plurality of luma samples on the picture boundary, and
has a distance closest to the one or more of the N luma samples outside the picture boundary.

4. The method of claim 1, wherein the picture boundary is one of a right boundary or bottom boundary of the picture.

5. The method of claim 1, wherein N is a power of 2.

6. The method of claim 1, wherein N is a fixed number.

7. The method of claim 1, wherein the N is dependent on a size of a coding tree block (CTB).

8. The method of claim 1, wherein the N is less than or equal to the size of the coding tree unit for the picture.

9. The method of claim 1, wherein the chroma scaling factor is determined based on an average value of the N luma samples.

10. A non-transitory computer-readable medium storing a data stream associated with a video sequence, wherein the data stream comprises syntax elements:
signaling a chroma scaling factor associated with a target coding block, or
being used for deriving the chroma scaling factor,
wherein the chroma scaling factor is determined based on N luma samples, the N being independent of a size of the target coding block,
wherein the N luma samples are determined based on a first coding block associated with the target coding block, and
wherein when one or more of the N luma samples are outside a boundary of a picture, the one or more of the N luma samples are replaced with a luma sample on the picture boundary.

11. The non-transitory computer readable medium of claim 10, wherein the luma sample on the picture boundary:
is determined from a plurality of luma samples on the picture boundary, and
has a distance closest to the one or more of the N luma samples outside the picture boundary.

12. The non-transitory computer readable medium of claim 10, wherein the picture boundary is one of a right boundary or bottom boundary of the picture.

13. The non-transitory computer readable medium of claim 10, wherein N is a power of 2.

14. The non-transitory computer readable medium of claim 10, wherein N is a fixed number.

15. The non-transitory computer readable medium of claim 10, wherein the N is dependent on a size of a coding tree block (CTB).

16. The non-transitory computer readable medium of claim 10, wherein the N is less than or equal to the size of the coding tree unit for the picture.

17. The non-transitory computer readable medium of claim 10, wherein the chroma scaling factor is determined based on an average value of the N luma samples.

18. A video decoder, comprising:
a memory figured to store instructions; and
one or more processors configured to execute the instructions to cause the video decoder to perform:
determining, based on encoded syntax elements in a bitstream associated with a video sequence, a chroma scaling factor associated with a target coding block; and
performing chroma residual scaling of the target coding block using the chroma scaling factor,
wherein the chroma scaling factor is determined based on N luma samples, the N being independent of a size of the target coding block,
wherein the N luma samples are determined based on a first coding block associated with the target coding block, and
wherein when one or more of the N luma samples are outside a boundary of a picture, the one or more of the N luma samples are replaced with a luma sample on the picture boundary.

19. The video decoder of claim 18, wherein the encoded syntax elements include an index signaling the chroma scaling factor or being used for deriving the chroma scaling factor.

20. The video decoder of claim 18, wherein the luma sample on the picture boundary:
is determined from a plurality of luma samples on the picture boundary, and
has a distance closest to the one or more of the N luma samples outside the picture boundary.

* * * * *